United States Patent [19]

Kuehrle

[11] Patent Number: 4,792,860
[45] Date of Patent: Dec. 20, 1988

[54] THERMODYNAMIC PRINTING METHOD AND MEANS

[76] Inventor: Manfred R. Kuehrle, Waldesruh, Rte. 103A, New London, N.H. 03257

[21] Appl. No.: 19,780

[22] Filed: Feb. 27, 1987

[51] Int. Cl.$^4$ .................................. H04N 1/23
[52] U.S. Cl. ............................ 358/300; 346/155; 346/157
[58] Field of Search ............... 358/296, 298, 300; 430/31. 56, 57; 118/661; 346/155, 157

[56] References Cited

U.S. PATENT DOCUMENTS

| | | | |
|---|---|---|---|
| 3,079,272 | 2/1963 | Greig | 430/620 |
| 4,307,165 | 12/1981 | Blazey et al. | 430/31 X |
| 4,521,805 | 6/1985 | Ayata et al. | 358/298 X |
| 4,611,217 | 9/1986 | Iizuka et al. | 358/298 X |
| 4,626,876 | 12/1986 | Miyagawa et al. | 358/300 X |
| 4,641,200 | 2/1987 | Shoji et al. | 358/296 |

FOREIGN PATENT DOCUMENTS

62-118359  5/1987  Japan .

Primary Examiner—Clifford C. Shaw
Attorney, Agent, or Firm—Nutter, McClennen & Fish

[57] ABSTRACT

In a method of printing on a printing medium a variable thickness ink dot pattern representing an original image in response to an incoming digital data stream, a printing member, e.g. a cylinder, is formed which defines a multiplicity of discrete, independently electrically chargable capacitor microcells adjacent to a printing surface of that member. Selected ones of the microcells are activated in accordance with the incoming data stream so that the activated microcells are geometrically related to the dots in the pattern to be printed. Then, electrical charges are deposited on the microcells selected for activation at controlled variable coulombic charge levels to create at the printing surface, localized electrical fields of various strengths that are proportional to the print densities desired for the related dots in the pattern to be printed. Following this, the printing surface is contacted by a two-component, voltage sensitive, thermoplastic ink whereby ink colorant, under the influence of the fields, is deposited on the printing surface only at the locations of the microcells selected for activation, with the thickness of each ink deposit being proportional to the strength of the field at that microcell, thereby to form a variable-thickness ink pattern on the printing surface. That ink pattern is then transferred completely to the printing medium to provide a faithful hardcopy reproduction of the original image. Apparatus for practicing the method are also disclosed.

53 Claims, 5 Drawing Sheets

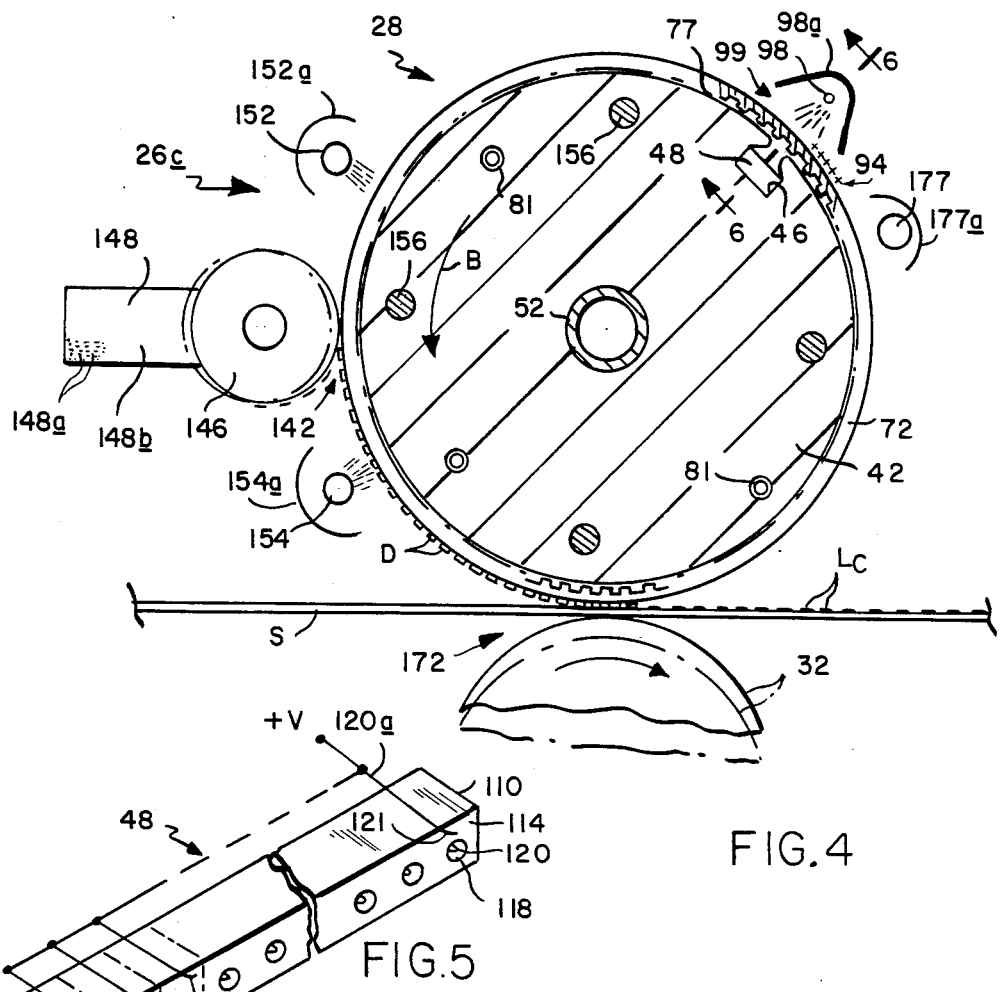
FIG.4
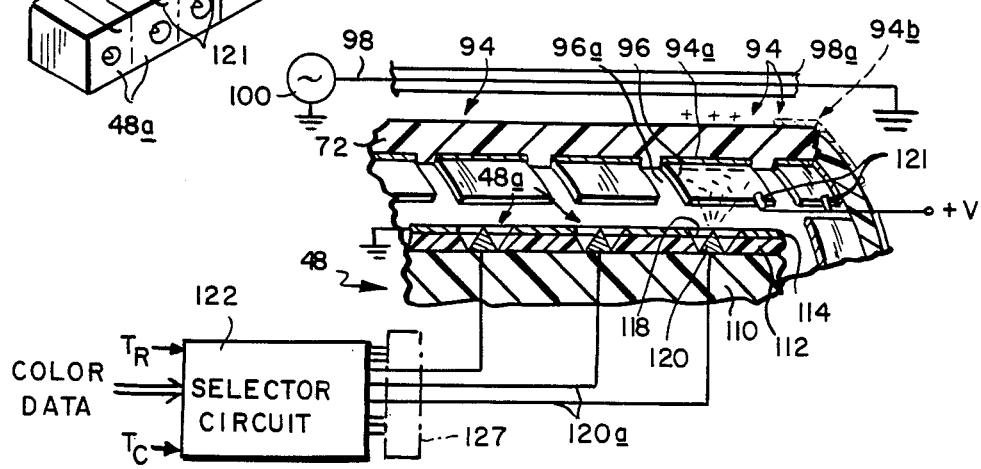
FIG.5
FIG.6

THERMODYNAMIC PRINTING METHOD AND MEANS

This invention relates to electrostatic printing. It relates more particularly to method and means for printing thermodynamically or at an elevated temperature.

BACKGROUND OF THE INVENTION

Hard copy printing may be accomplished in a variety of ways including offset techniques, rotogravure methods, photographic techniques, ink jet and thermographic printing. More recently, printing techniques have been developed which form an image as a pattern of electrical charges on a receptor or surface. Toner can then be applied to that surface for transfer to a paper sheet. Such techniques include xerography in which a photosensitive drum or plate is selectively discharged by exposure to a light image, as well as ion printing in which a stream of ionically charged gas molecules from an ion source is guided through a control grid to a receptor surface to create an ionic charge pattern on that surface. Some laser printers also write information on a photosensitive receptor surface by selectively discharging that surface using a scanning beam of coherent light. Each of these printing methods has certain advantages which suit specific markets. However, none of them are capable of producing a print with the quality of a photographic print at a very low cost per page and in a short time, i.e., seconds, using a simple, relatively inexpensive, variable data printer.

Xerographic printers probably come as close as any to satisfying all of these desirable criteria. The typical xerographic printer consists of an electrostatically chargable drum, a charging station for charging the drum, an exposing station at which an electrostatic image is applied to the drum surface, a toning station at which electroscopic powder or liquid is applied to the drum surface to develop or render visible the electrostatic image thereon, a transfer station where the toner image is transferred onto paper and a fusing station at which the toner particles are fused to the paper, while the drum is being readied for the next exposure at a cleaning station. Invariably, in electrostatic printers and copiers, the fusing station must be off-line because conventional electrostatic drums cannot tolerate heat. In other words, heat effects adversely the photoconductive material of the drum, causing, among other degradations, the loss of the charge image on the drum.

Also, because the different steps in the prior xerographic processes are carried out at different stations, these printers and copiers operate at relatively slow speeds, and, thus, have relatively low copying rates. Furthermore, they constitute fairly complex mechanical apparatus requiring elaborate optics and toner transport systems in the form of pumps and ancillary plumbing or toner powder dispensers, cleaning brushes, etc. Also, the quality of the copies produced by prior electrostatic and xerographic printing systems is still not as high as is desired, particularly in the case of those printers capable of printing in color.

Accordingly, it would be desirable to provide a printing system or press which can print consistently very high quality copies in black and white or in color on ordinary paper and do this economically and at high speed.

SUMMARY OF THE INVENTION

Accordingly, it is an object of the present invention to provide improved printing method and means.

Another object of the invention is to provide an electronic printing press which can make color prints of unusually high quality in terms of resolution, color intensity and range of color registration.

A further object of the invention is to provide electronic printing apparatus whose operating principles permit printing at a high rate of speed if desired, limited primarily by the data rate of the incoming data stream.

A further object of the invention is to provide apparatus of this type whose control over the color density and the resolution of the resultant hard copy is absolute and not dependent upon chemistry, atmospheric pressure, humidity and other factors which plague many conventional electrographic printing systems.

Another object of the invention is to produce hard-copy prints on ordinary paper whose color rendition and resolution equal those of photographic prints.

Another object of the invention is to provide printing apparatus which can print on metal, on textiles, and on a variety of other materials besides paper.

It is another object to provide such apparatus which provides high quality prints on plain or coated paper at a relatively low cost per copy.

Another object is to provide an electronic printer that allows positive control over the location and shape of each discrete resolution element or dot in the printed copy.

Still another object is to provide printing apparatus of this type which allows control over the optical density of each resolution element or dot in the printed copy.

Yet another object is to provide an improved printing cylinder or drum for an electronic printer.

Another object is to provide an electronic color printer such as this which can print using thermoplastic or hot-melt inks.

A further object is to provide electronic printing apparatus with an improved receptor surface for acquiring an electronic image.

Yet another object is to provide improvements in the development of images in an electronic printer.

Still another object of the invention is to provide an electronic printing method which produces one or more of the above advantages.

Other objects will, in part, be obvious and will, in part, appear hereinafter.

The invention accordingly comprises the sequence of steps, combination of elements and arrangement of parts which will be exemplified in the following detailed description, and the scope of the invention will be indicated in the claims.

Briefly, a printing system or press made in accordance with my invention incorporates one or more substantially identical modular printing units, the number of such units depending upon the number of color components desired for the prints. Thus, when printing in black and white, a single such unit suffices. When printing in four colors, four printing units are used, with one unit printing each color. The four units are arranged in series and operated in synchronism so that paper or other printing medium from a suitable supply is guided from one unit to the next. Each printing unit prints on the paper or other medium a copy of the document being reproduced in the color corresponding to the ink dispensed by that unit. Each printing unit after the first prints in register with the previous unit or units so that the finished printed copy is a four-color reproduction of the original document.

In certain applications, an office copier, only a single printing drum or surface is used to create such multicolor prints. In this type of printer to be described in more detail later, the drum or surface is shifted to fetch different colorants from a source and to transfer them in succession onto the receptor sheet.

Preferably, the inks used in my printing press are highly transparent, subtractive color inks; they usually have the primary colors cyan, yellow and magenta, plus black. The resultant color reproductions are composed of these four different color ink layers deposited one on top of the other and having various optical densities (thicknesses) in different parts of the print. This type of printing, which I have named "congruent area printing" (CAP), is the type of printing sought for a long time by the graphics industry.

While my color printing apparatus is similar to prior color presses in that it employs a separate printing unit to print each color, it differs drastically from conventional presses in the makeup of these printing units. More particularly, in each printing unit of my press, an electronic image is applied to a heated dielectric printing member, preferably a cylinder, whose outer surface is slightly ink repellant or otherwise conditioned to reject to some extent the ink used in the press. The cylinder, which has a special design to be described in detail later, is a thin-walled, lightweight, heat-resistant dielectric tube having great strength and minimal rotational inertia. It is preferably made of sapphire ($Al_2O_3$). The wall of the cylinder carries an array of tiny prefixed capacitor microcells or islands. Each cell consists of a tiny metallic platelet on the inner surface of the cylinder wall plus the dielectric cylinder material opposite the platelet that extends to the cylinder outer surface. The platelets are deposited, by a microlithographic process, in rows along the length of the cylinder and in columns around the inner circumference of the cylinder. The cylinder outer surface ordinarily shows no cells and is perfectly smooth.

During the recording of the dielectric image on the cylinder, the cylinder is controlledly rotated, using a high resolution angular encoder or clock track on the cylinder, either stepwise or continuously about its axis relative to a linear array of tiny electron sources or F-beam emitters positioned inside the cylinder. The array extends parallel to the cylinder axis and is positioned close to the inner surface of the cylinder wall so that it can deposit negative charges or electrons on the capacitor plates of the row of microcells opposite the emitter. Located outside the cylinder at a recording station directly opposite and parallel to the emitter array is an AC corona source. This source has the capacity to direct positive charge carriers onto the outside surface of the cylinder in juxtaposition to the capacitor plates on the inside of the row of microcells that is between that source and the emitter array. Because of the AC characteristic of the corona source, all of those positive charge deposits are neutralized which are not bound by negative charges deposited on the inside of the cylinder by the emitter array.

During printing, selected electron emitters in the emitter array are activated in accordance with the information content of an incoming data stream representing the optical densities or color values of successive resolution elements of a line-by-line-scanned original document or image. If the original image is in black and white, the incoming data represents grey scale values; if the original image is in color, the data represents the tonal densities of a particular color component, i.e. red, green or blue, in the original document or the equivalent subtractive color component, i.e. cyan, yellow or magenta, for the image to be printed. The selected emitters respond by controlledly spraying tiny beamlets of electrons onto the inside capacitor plates of the microcells opposite those emitters.

Thus, when the first row of microcells on the cylinder is positioned directly opposite the emitter array, certain emitters are activated either simultaneously or successively to deposit electrons onto the microcell inner plates at coulombic, capacitive, numerical values that correspond to the grey scale densities or color values at corresponding locations (resolution elements) in the original document being reproduced. The deposition of negative charges at each such electronically "imaged" microcell in the first row of cells results in the capture at the outside surface of the cylinder opposite that cell of an equal number of positive charges from the AC corona source. The positive charge domain or island on the outside of the cylinder at each cell is essentially the same size as the negatively charged microcell plate on the inside of the cylinder, with the charge amounts being in numerical equilibrium. The closure of the field lines around the edges of each imaged cell produces a desired "spread" which blanks out all gaps between adjacent charged microcell areas. Thus at each such imaged cell, a discrete electrostatic field exists whose field strength represents the grey scale density or color value at the corresponding location in the original document. Unimaged microcells, corresponding to areas of the original document where the particular color is not present, acquire no charge.

After the microcells in the first row on the cylinder are charged selectively as aforesaid, the cylinder is moved around, with the aid of the encoder or cylinder clock track, to the exact position that locates the next row of microcells directly between the emitter array and the corona source. The emitters are thereupon activated selectively again in accordance with incoming data representing the optical density values for the second line of resolution elements in the original document. This results in the selective charging of the capacitor microcells in the second row, both in terms of location and magnitude, to produce localized electrostatic fields in that row whose strengths correspond to the optical densities of the second line of resolution elements in the original document that was scanned. The cylinder is then moved again to position the third row of capacitor cells opposite the emitter array and the picture information for the third line of resolution elements in the original document is recorded in flight electronically on that third row of cells, and so on, with the image growing circumferentially around the cylinder as an axial band, rather than helically as in some conventional plotters and printers. In other words, the cylinder receives an electronic image while continuously moving past the stationary emitters.

Thus, after a complete revolution of the cylinder past the emitter array, a pattern of electrostatic fields exists at the cylinder outer surface which is an electronic analog of the picture content for a particular color (i.e. color separation) in the original document or image being copied. It is important to note that the shape and locations of the tiny positively charged surface areas of the cylinder wall which comprise the electronic image stored on the cylinder are precisely defined by the shapes and the layout of the cells in the microcell array. This is in sharp contrast to those printers described at the outset which rely on movable optics, deflection fields and the like to electrostatically charge a receptor surface and which, therefore, apply the image less accurately to that surface and are plagued by raster deviations and mislocations.

Of particular importance here also is the fact that in my press the incoming data stream positively controls the coulombic charge level deposited at each microcell on the cylinder to produce a tiny discrete electric field there whose strength is proportional to the optical density (in terms of color saturation and hue) desired for the picture element represented by that cell. Therefore, the image stored on the cylinder can be truly representative of the color content in the original image. Moreover, that accurate electronic latent image will remain on the cylinder until deliberately erased.

After part or all of an image is recorded on the cylinder as aforesaid, the press prints one or more copies of that image onto paper or other media by first inking the outer surface of the cylinder so that ink adheres to that surface in accordance with the field strength distribution thereon to form an ink pattern having an optical density (thickness) distribution corresponding to that of the corresponding color in original document, or any chosen pseudo or false color, and then transferring that pattern to the paper or other media.

The inking step is accomplished at an inking station adjacent to the cylinder which, as noted above, is heat resistent. At that station there is a preheated inking member which extends the entire length of the cylinder and which can be shifted into engagement with the cylinder surface. That member brings a special hot-melt ink into contact with the cylinder surface. This ink is a two-component ink comprising a relatively low melting point thermoplastic carrier which supports a myriad of higher melting point, thermoplastic (or non-meltable), voltage sensitive colorant particles dispersed in the carrier. At the inking station, the ink is heated sufficiently to melt the carrier material, but not the colorant particles, so that ink that will contact the cylinder at each contiguous cell thereof exists on the inking member as a coherent liquid film filled with a suspension of solid colorant particles.

When the press is printing, the inking member is moved against the cylinder so that the ink film contacts the surface of the printing cylinder. The liquid carrier component of the ink does not wet that surface because the surface is phobic to the ink as noted above. However, the still solid colorant particles dispersed in that liquid, being voltage sensitive or electroscopic, respond to the externally applied electric fields which comprise the electronic image pattern present on the cylinder. Resultantly, as the cylinder is rotated, the electronic image thereon approaches the inking station with a straight edge consisting of positively charged cylinder outer surface areas (microcells). The positively charged surface areas, which correspond to the negative charge pattern resident on the plate array at the inside of the cylinder, pick up negatively charged colorant particles from the liquid ink carrier, creating rows of discrete color deposits on the cylinder surface areas opposite the charged microcells. Due to the above-mentioned field spread, there are no ink gaps between adjacent charged microcells. However, the ink particles do not adhere to the cylinder surface areas corresponding to uncharged, i.e. unimaged, microcells. In other words, the force of the electrostatic attraction of the colorant particles to charged cylinder surface areas overcomes the slightly repellent property of the surface. Consequently, at each imaged microcell, a localized toning step is performed whereby those particles adhere to the cylinder surface at that cell and are carried along as a stationary discrete color deposit on the rotating cylinder, while the still-liquid carrier is repelled by that surface and remains on the inking member, as do the ink particles opposite uncharged areas of the cylinder surface.

The color pattern acquired by the cylinder thus consists of rows of tiny discrete color ink deposits or spots all of which have essentially the same area and shape, but all of which are amplitude or thickness-modulated by the electronic image on the cylinder. This feature is particularly important in view of the fact that the subtractive color inks used in my press are preferably hot melt inks which result in minimal or no intermixing between the different-color overlapping ink layers that contribute to the final color at each resolution element of the printed copy. Thus, by accurately controlling the heights or thicknesses of the colorant deposited at the various cells on the cylinder, my press obtains precise control over the color values at the corresponding locations in the copies printed by the press.

After being inked, the cylinder surface is advanced cell row-by-cell row to a transfer station. Before reaching that station, however, if the colorant particles are of the meltable type, the cylinder surface at these advancing cell rows is heated to a temperature high enough to melt the particles deposited on the cylinder surface opposite those cells. Resultantly, the particles resident at each such microcell coelesce on the cylinder to form a single tiny spot or drop of liquid colorant. At a nip between the cylinder and a pressure roller at the transfer station, the colorant drops adhering to the cylinder surface opposite successive rows of charged microcells are transferred or offset to the paper or other receptor medium. Upon contacting that relatively cool (room temperature) surface, the molten colorant is absorbed to some extent by the paper and otherwise immediately hardens and becomes fused to the paper or other medium as the melt solidifies. During the solidification process, which takes only microseconds, the still-liquid surface of the ink droplet which contacts the warm print cylinder increases its cohesion as it cools and thus comes off the cylinder surface in its entirety (100%). Thus, after a complete revolution of the cylinder relative to the transfer station, the paper carries a permanent, high-quality copy of the electronic image stored on the cylinder.

At the transfer station, there is substantially total transfer of colorant to the paper. Therefore the color values of the actual print on the paper correspond to the controlled-thickness ink deposits on the cylinder. Furthermore, being completely free of ink, the cylinder surface does not even have to be cleaned prior to printing the next copy of the electronic image present on the cylinder during the next revolution of the cylinder. Thus, in my printing unit toner transfer, fusing and cleaning are carried out at a single station, whereas a conventional xerographic copier requires three separate stations to perform these functions. Indeed, in one version of my printer capable of printing in three colors, a single station performs the toner transfer, fusing and cleaning functions, whereas a conventional xerographic color copier requires at least nine such stations to print copies in three colors.

The serially arranged modular printing units in my electronic printing press produce the desired color components of the original document in the register on the same sheet of paper. The units lay successive, different-color ink layers congruently onto the paper to achieve particular color hue and saturation values over the area of the print. As discussed, these values can be controlled exactly to mirror the color values at the corresponding locations in the original document or any artificial color rendition desired in a particular application such as, for example, in medicine to highlight a particular organic defect. Resultantly, the finished copy leaving the press has unusually high color and resolution qualities. Indeed, its color rendition and resolution are comparable to those of a photographic print. Moreover, such color control is absolute and not dependent upon ink chemistry, humidity, atmospheric pressure and other such variables that affect conventional printing and copying apparatus described at the outset.

When it is desired to erase the electronic image stored on the cylinder, the microcells are discharged by light from a U.V. lamp located adjacent to the cylinder whose sapphire material becomes conductive in the presence of such short wavelength radiation.

As will be seen, my press can operate in a single copy mode and in a multiple copy mode. In the former, during successive revolutions of the print cylinder, a succession of images are recorded electronically on the cylinder, the cylinder is inked to produce a corresponding succession of ink patterns on the cylinder and the ink patterns are transferred to successive sheets of paper or other receptor medium. After each print is made, the electronic image stored on the cylinder is erased and replaced by a new image. Thus the press records, inks, transfers and erases electronic images continuously all at the same time. This mode of operation is particularly useful for short press runs and when it is desired to produce collated copies of different images. It has particular application in a bindery, for example, to greatly simplify the printing of books. In its other mode of operation, the press records an image on the cylinder during one revolution of the cylinder and then the cylinder is rotated continuously, without the image being erased, to reink the cylinder and transfer the same, but refreshed, ink pattern to paper to print many copies of the same document. In other words, the inking and transfer steps are separated from the recording step and the image stored on the cylinder is not erased following the transfer step. This second mode of operation is useful, for example, to make many prints of the same image, i.e. a long press run.

In both modes of operation, the repeated application of the colorant to the cylinder and the heating of the cylinder during the inking and transfer steps described above have no appreciable adverse effect on the image stored electronically on the cylinder. Moreover, there is minimal charge leakage from the cylinder because of the high dielectric quality of that member. Therefore, when the press is printing in its latter mode, the information content in the image stored on the cylinder is just as high after making many copies as it was when the image was initially recorded on the cylinder. If, however, the image does begin to degrade over time, it can be refreshed without having to actually re-record the image, as will be described in more detail later.

Images can be recorded on the print cylinders of my press at a high rate. In fact, the recording speed is limited only by the data rate of the incoming digital data stream. The transfer of the inked images from the cylinders to paper or other recording medium is also accomplished quite efficiently by my press so that for long press runs, the speed of the press can be comparable to that of a conventional printing press. Because of this and the other advantages just described, the press should find wide application in the printing and graphics industries.

BRIEF DESCRIPTION OF THE DRAWINGS

For a fuller understanding of the nature and objects of this invention, reference should be had to the following detailed description, taken in connection with the accompanying drawings, in which:

FIG. 4 is a sectional view on a still larger scale taken along line 4—4 of FIG. 3;

FIG. 5 is a fragmentary isometric view on a very large scale showing a portion of the FIG. 3 printing unit in more detail;

FIG. 6 is a sectional view taken along lines 6—6 of FIG. 4;

DESCRIPTION OF THE PREFERRED EMBODIMENTS

Figure 1:
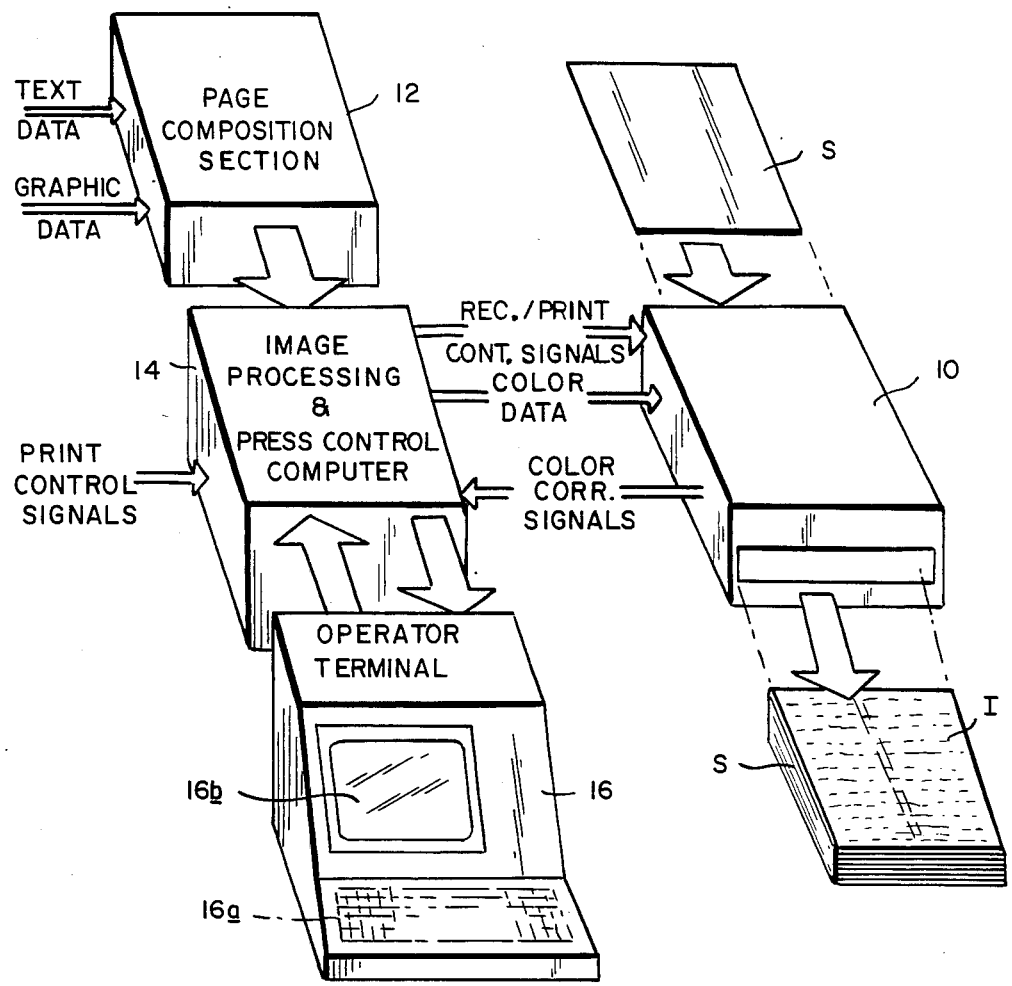
FIG. 1 is a block diagram of a complete printing system incorporating an electronic printing apparatus or press made in accordance with my invention.

Referring to FIG. 1 of the drawings, color printing apparatus incorporating my invention and indicated generally at 10, is shown integrated into a complete color graphic reproduction system. This overall system includes a page composition section 12 which receives a stream or streams of digital signals representing text and/or graphics. These signals may originate, for example, at a conventional optical scanner in which case they constitute a stream of data representing the color values (saturation and hue) at successive resolution elements of a line-by-line-scanned original document or image. The signals could just as well be the output of an electronic camera such as the one disclosed in applicant's copending application Ser. No. 872,891, filed June 11, 1986. Section 12, under the control of an image processing and control computer 14, formats the signals in accordance with operator instructions applied to the system by way of a terminal or workstation 16 and develops signals representing equivalent subtractive color values. Terminal 16 includes a keyboard 16a and a CRT 16b. By proper key selection, the operator can combine the incoming signals so as to compose a page of copy which he can view on CRT 16b. He can also perform color correction, scaling, cropping and other operations normally envolved in making color reproductions.

When the operator is satisfied with the page layout and its color composition, he instructs computer 14 by way of keyboard 16a to send cyan, yellow, magenta and black Color Data, as well as Record/Print Control Signals to press 10. Press 10 responds to these signals by printing a picture or image I in black and white or in color on the web or sheet S conducted through the press. That sheet may be one of a succession of individual sheets fed from conventional paper feeder on part of a continuous web drawn from a roll. While the sheet is usually made of paper, it can be a fabric or a plastic or even a metal. As will be described in detail later, press 10 is able to sense the color content of the printed image I on sheet S for comparison with color standards to produce Color Correction Signals. These signals are fed back to computer 14 which thereupon adjusts the Color Data to press 10 to correct the color errors.

Figure 9:
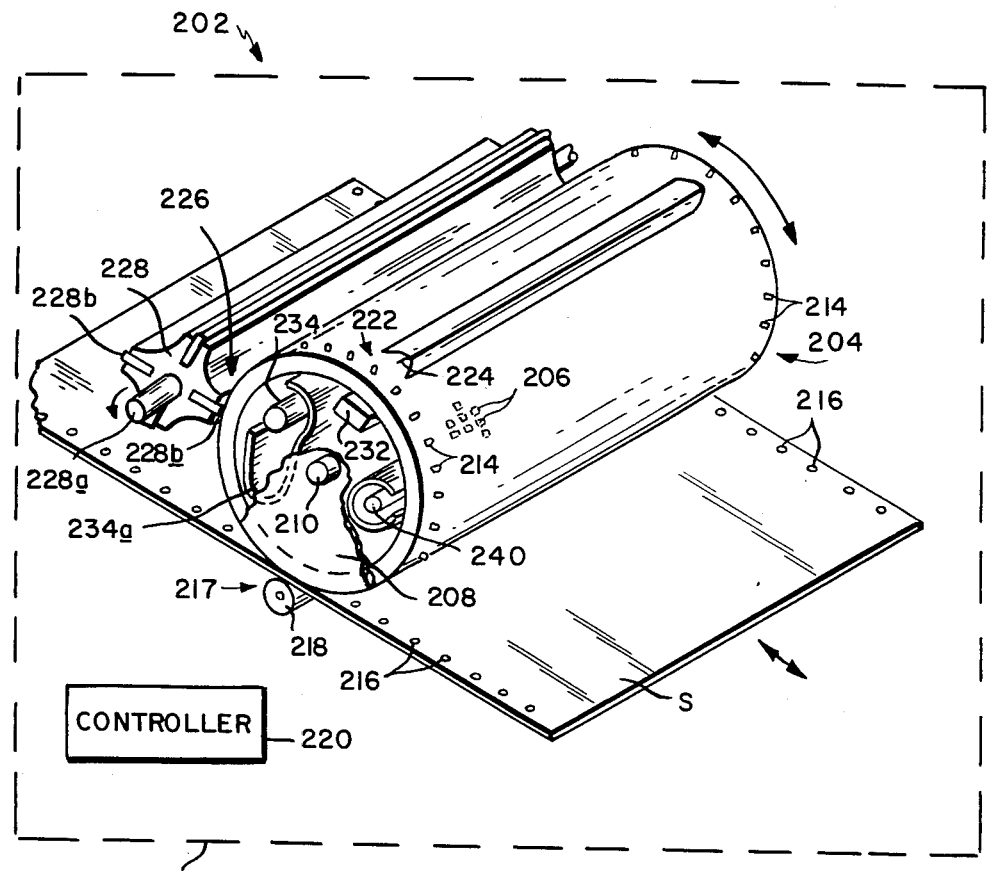
FIG. 9 is an isometric view with parts broken away showing the important parts of a desk top color printer incorporating my invention.

Section 12, computer 14 and terminal 16 are more or less conventional units customarily found in pre-press systems used in the graphics industry. They should have sufficient memory and processing capabilities to condition, process and format the incoming text and graphic data and to route the data to press 10 at a data rate that enables the press to produce prints at a high successive printing rate, thus enabling the system as a whole to perform virtually "on-demand" printing. While the invention is described here primarily in terms of a high-speed four color press, as we shall see in connection with FIGS. 9 and 10, the invention can just as well be incorporated into a small office copier for making single or multiple copies in black and white or in color.

Figure 2:
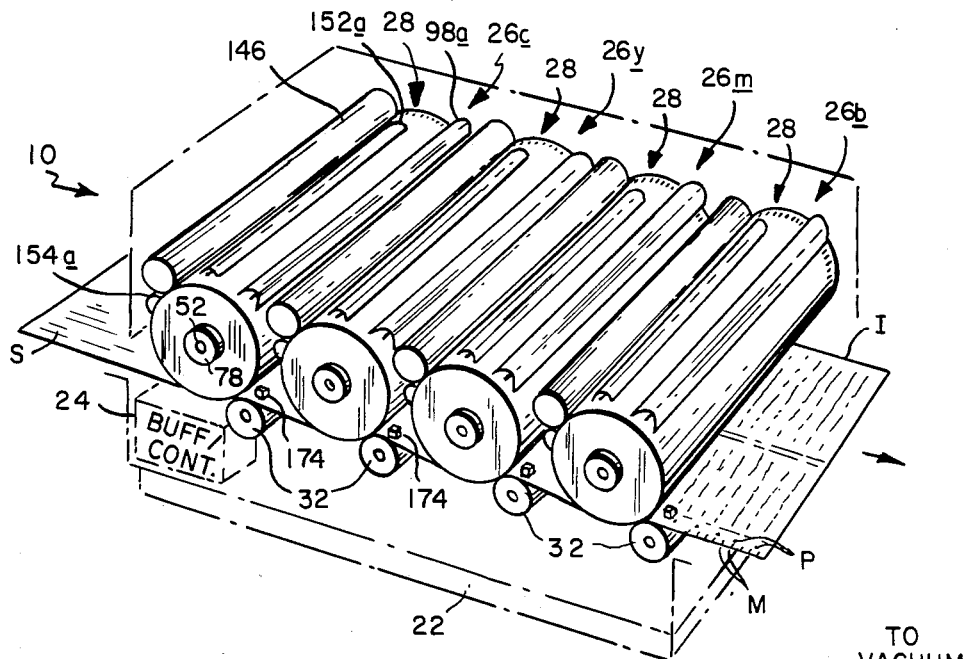
FIG. 2 is an isometric view away, of the press.

Referring now to FIG. 2, the components of press 10, which are contained in a housing 22, include an electronic buffer/controller 24 which receives the Record/Print Control Signals and Color Data from computer 14 and applies those signals at the appropriate times to a set of modular printing units inside the housing. Press 10, which is a four-color press, has four such printing units 26c, 26y, 26m and 26b which print the subtractive colors cyan, yellow, magenta, as well as black, respectively. The four printing units are substantially identical. Accordingly, we will describe in detail later only one of them, i.e. unit 26c.

Each printing unit includes a drum shown generally at 28 rotatively mounted in housing 22 and a backup or pressure roller 32 also rotatively mounted in the housing and movable into and out of engagement with the drum surface. The printing units are arranged in series with their drums and rollers parallel to one another so that sheet S enters the left-hand end of housing 22, is guided under the drum 28 and over the roller 32 of each printing unit and exits housing 22 through the right-hand end thereof.

In order to reproduce original color documents or images, electronic images representing the red, green, and blue color components (i.e. separations) of the original document or image, as well as a separation for white light, are recorded on the drums 28 of the four printing units, respectively, using the properly formatted Color Data from computer 14 (FIG. 1). The deriving of such data from the original document is quite well known. Suffice it to say that the original document is scanned, line by line, by a detection head having four color channels. Three channels have appropriate spectral filters to detect red, green, and blue light respectively reflected from the scanned document. The fourth channel detects the grey level and color temperature of the light reflected from that document so it can be compared to the color and grey level of sheet S to accomplish color correction via computer 14. The four analog signals from the four detectors are digitized to provide four data streams representing the red, green and blue color components of the scanned original and its grey scale for white light. The four data streams are applied to computer 14 by way of page composition section 12, merged with similar data representing other text and graphics and converted to equivalent substrative color values. Computer 14 thereupon delivers four data streams containing all the self-calibration adjustments for automated print quality control to the buffer/controller 24 of press 10 which routes the four streams at the appropriate times to the four printing units 26 of the press.

Following the recording on the four drums 28 of the patterns of charges representing the picture information in the original document, different-color thermoplastic electroscopic inks are applied to the surfaces of the four drums. Since press 10 is organized for subtractive color congruent area printing (CAP), the inks used have the colors, cyan, yellow, and magenta and black. The electronic charge patterns on the four drums 28 control the deposits on the drum surfaces of those inks so that when the drums are rotated in synchronism with the paper sheet S pressed against the drum surfaces by the respective pressure rollers 32, the color deposit patterns on the four drums are transferred to the paper sheet in perfect register on top of each other, i.e. without screen angles and rosettes, so that the paper leaving press 10 carries very high quality color reproductions of the original document or image.

Figure 3:
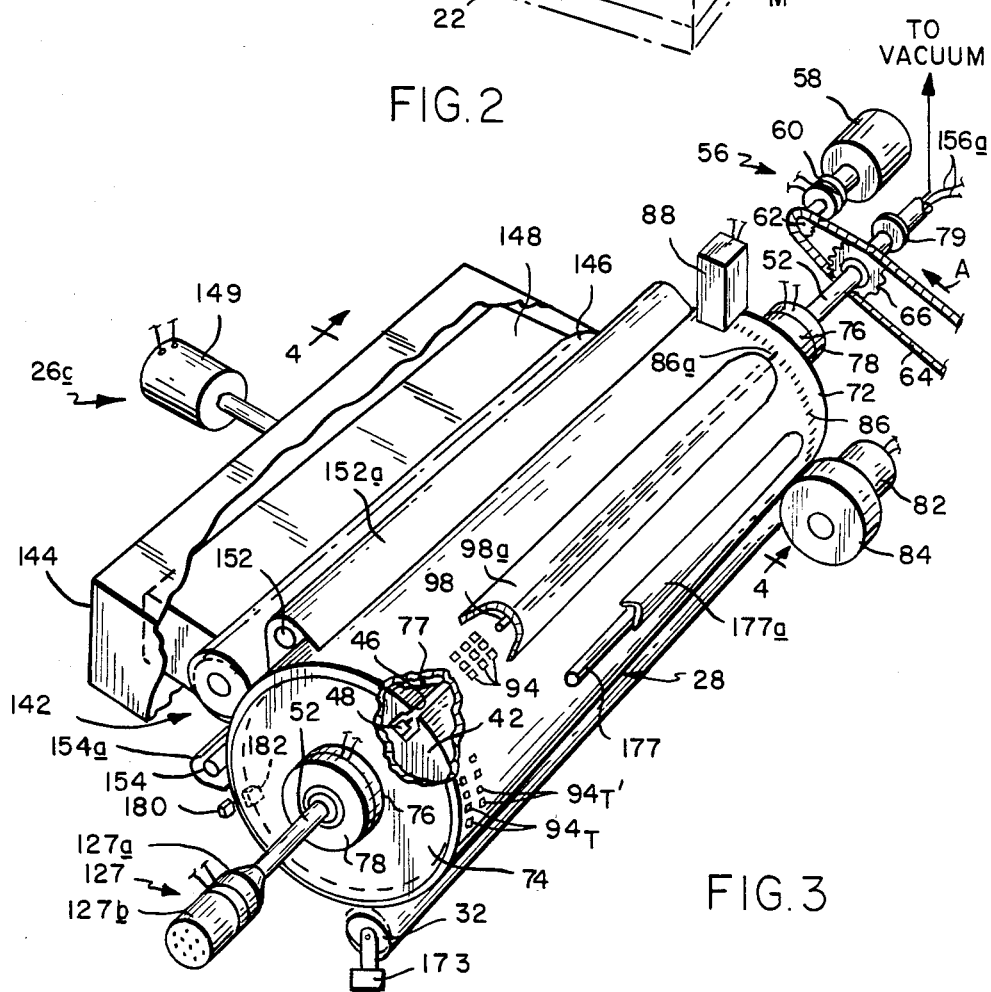
FIG. 3 is a similar view on a larger scale and with some parts broken away showing in greater detail one modular printing unit of the press.

Refer now to FIG. 3 which shows the modular printing unit 26c (as well as the other units) in greater detail. As seen there, drum 28 is not a unitary member. Rather it comprises an inner roll 42 made of a mechanically stiff material such as steel whose thermal coefficient of expansion is different from that of the outer sleeve. The diameter and length of the roll depend on the size of the press. Typically the roll is in the order of 8 inches in diameter and 40 inches long. The roll is more or less solid except for the presence of a narrow axial slot 46 at the cylindrical surface of the roll, which slot extends substantially the entire length of the roll. Positioned in slot 46 is an electron emitter array 48 to be described in detail later in connection with FIGS. 5 and 6.

Roll 42 is mounted for rotation with a tubular shaft 52 which is journaled in the walls of housing 22 and rotated in synchronism with corresponding shafts in the other printing units by suitable motive means indicated generally at 56. Motive means 56 comprises an electric motor 58 which drives the input shaft of an electric clutch 60, the output shaft of which is connected to a gear 62. Gear 62 drives a timing chain 64 which engages a gear 66 at the end of shaft 52, as well as corresponding gears in the other printing units comprising press 10.

When an image is being recorded on drum 28, motor 58 and clutch 60 are controlled by buffer/controller 24 to maintain drum roll 42 in a "home" position shown in FIG. 3. When the recorded image is being printed out on sheet S, the motor 58 drives chain 64 28 counterclockwise as shown by Arrow A.

In addition to roll 42, drum 28 includes a cylinder or sleeve 72 which encircles roll 42. Cylinder 72 is slightly longer than roll 42 and the opposite ends of the cylinder are closed by a pair of end plates 74 which are rotatively mounted to shaft 52 by way of a pair of rotary seals 76 and an adjacent pair of clutches 78. Clutches 78 may be one-way clutches, but more preferbly they are electric clutches operated under the control of buffer/controller 24. They are designed so that cylinder 72 can be rotated independently of roll 42 in at least one direction, which in the FIG. 3 printing unit, is the counterclockwise direction. Accordingly, when roll 42 is rotated counterclockwise by motive means 56 and clutches 78 are engaged, cylinder 72 rotates with the roll with no slippage. On the other hand, when roll 42 is stationery in the position shown in FIG. 3, and clutches 78 are disengaged, cylinder 72 can be rotated counterclockwise ralative to the roll. Desirably, a very thin sleeve 77 of a self-lubricating, dielectric material such as TFE is interposed between roll 42 and cylinder 72 to electrically isolate the cylinder from the roll and to provide a bearing surface between the cylinder and roll.

Also, in lieu of clutches 78, the roll 42 and cylinder 72 themselves can be designed to achieve this clutching action. More particularly, the steel of roll 42 and the sapphire of sleeve 72 have markedly different coefficients of thermal expansion, i.e. $17 \times 10^{-6}/°C$. vs. $4.5 \times 10^{-6}/°C$. Therefore, the diameters of the roll and cylinder may be selected so that at room temperature, the cylinder is shrink-fitted to the roll and rotates with the roll. Also, cooling coils 81 (FIG. 4) may be incorporated into roll 42 to shrink the roll to a lesser diameter so that the cylinder 72 can be rotated independently of the roll when that is necessary.

The cylinder 72, with its rotary seals 76, is designed as a gas-tight enclosure to enable a relatively high vacuum, e.g. $10^{-7}$ Torr, to be maintained inside the cylinder in order to optimize the performance of the emitter array 48 to be described later. For this purpose, provision is made for coupling the right-hand end of the tubular shaft 52, by way of a rotary seal 79, to a vacuum pump and small radial holes (not shown) communicating with the cylinder interior are provided in the shaft wall at locations just inside cylinder end plates 74.

Cylinder 72 is rotated independently of roll 74 by a motor 82 which rotates a wheel 84 that is in non-slip driving engagement with the surface of the cylinder at the right-hand end thereof. Means are provided for monitoring the angular position of cylinder 72 so tht when roll 42 is fixed in its FIG. 3 home position and motor 82 receives drive signals from buffer/controller 24, cylinder 72 is rotated counterclockwise relative to roll 74 through precise angular increments sensed by the monitoring means and reflected in feedback signals applied to the buffer/controller 24. The monitoring means can be a simple angular encoder associated with wheel 84. Alternatively, in those cases where optical detection is desired, as shown in FIG. 3, the surface of the cylinder adjacent to motor 82 may carry position marks 86 corresponding to cylinder rotation increments and an optical encoder 88 may be positioned adjacent to cylinder 72 to detect these markings to develop corresponding angular position signals which are applied to buffer/controller 24. In any event, when an image is being recorded on the drum 28, buffer/controller 24 maintains a count of the cylinder position signals so that it "knows" the exact angular position of cylinder 72 relative to a selected reference position, e.g. the home position illustrated in FIG. 3 that locates a reference position mark 86a directly opposite slot 46 in roll 42.

Referring now to FIGS. 4 and 6, in contrast to conventional printing cylinders, cylinder 72 is made of a material which is hard, abrasion resistant, dimensionally stable, has low thermal conductivity and is an excellent electrical insulator. The cylinder specifically disclosed herein is made of sapphire (Al$_2$O$_3$). The cylinder may be drawn to that shape from a melt using, for example, a conventional FFG process; alternatively, it may be formed from a monocrystalline sheet by bending the sheet into a cylinder and welding the opposite butting edges of the sheet as described in applicant's copending application Ser. No. 872,893, filed June 11, 1986, which disclosure is incorporated by reference herein.

The sapphire material of cylinder 72 is quite hard and strong, having a Moh's hardness of about 9.0 and a tensile strength in the order of 355,000 psi and a modular elasticity of $67 \times 10^6$ psi. Therefore, the cylinder 72 itself is rigid and highly resistant to abrasion and wear by print paper surfaces. Yet it is relatively lightweight so that a relatively low power motor 82 is all that is required to accelerate and rotate the cylinder 72 relative to roll 72 when recording an image on the drum 28. In addition, sapphire has a very high melting point exceeding 2000° C. so that the heating of the cylinder which takes place during the printing process to be described has no adverse effect on the cylinder. A cylinder 72 made by the process disclosed in the above application can be made as a monocrystalline structure with a very thin, e.g. 4 mil, wall thickness and with very few defects in its internal crystal lattice so that the cylinder has especially good insulating properties. Accordingly, when electrostatic charges are applied to the cylinder surface during the recording process to be described, there is very little leakage of those charges from the cylinder over time.

As shown in FIGS. 4 and 6, the cylindrical wall of cylinder 72 carries a rectilinear array of identical capacitor microcells or islands shown generally at 94. A few of these microcells 94 are also indicated in FIG. 3 opposite roll slot 46. The microcells are arranged in rows extending substantially the entire length of cylinder 72 and in columns extending around most, if not all, of the circumference of the cylinder. As best seen in FIG. 6, each microcell comprises a tiny capacitor plate or electrode 94a affixed to the inner surface of the cylinder wall. While the microcells 94 (i.e. plates 94a) may have any one of a variety of shapes, the illustrated cells are square, being in the order of 35 micrometers on a side and they are spaced 5 microns apart, yielding a cell count in each row of 250 cells per centimeter and usually a similar count in each column of cells.

The plate 94a in each cell consists of a thin deposit or film of a suitable conductive metal such as chromium applied to the cylinder surface by known means such as vapor deposition or sputtering, with the aid of photolithography. Cells 94 may also include similar plates 94b on the outer surface of the cylinder congruently positioned opposite plates 94a. One such plate 94b is shown in phantom at the right side of FIG. 6. In FIG. 6, the thickness of plates 94a (and 94b) are exaggerated for clarity of illustration. In reality, the plates consist of a very thin (e.g. 1.5 microns) metal deposit or film so that plates 94b, particularly, do not materially detract from the inherent smoothness of the cylinder surface. It must be stressed, however, that it suffices to place the cell plates only on the inside of the cylinder, because, as we shall see, the electrical charge deposits on the outer surface of the cylinder when recording an image on the cylinder will adopt the nearly identical geometry and layout of the inside plates 94a when, as here, the cylinder possesses a thin wall and the outside charges derive from an AC corona source. But even if plates 94b are present, cylinder outer surface looks plain and smooth to the human eye when uninked, but it replicates the charge pattern on plates 94a when charged.

Due to the thinness of the cylinder wall described above, when the plates 94a and 94b (if present) of each microcell 94 are oppositely charged, there exists an electric field through the dielectric material opposite plate 94a whose field lines are contained so that they do not distub similar fields that may be present at adjacent microcells. Accordingly, cells 94 define potential sites of discrete localized electric fields which can have field strengths as high as $10^6$ volts/cm or more and have a "reach" of as much as 10 microns from the outer surface of the cylinder.

In order to further increase the electrical isolation of adjacent cells 94, the inner plates 94a of the cells can be placed at the bottoms of tiny shallow wells 96 etched into the inner surface of cylinder 72. Typically each well is in the order of 20 microns deep so that the plate 94a there is insulated from adjacent plates 94a by a dielectric well wall 96a which, in the illustrated cells, has a width of 5 microns. Also, as noted above, the drum 28 usually includes a thin, electrically insulating sleeve 77 between roll 42 and cylinder 72 to prevent the inadvertent discharge of cell plates 94a by contact with roll 42.

Referring to FIGS. 4 to 6, the means for selectively charging or "imaging" the capacitor microcells 94 comprise the emitter array 48 in the roll slot 46 and a source of positive charge carriers in the form of a corona wire 98, operating in the AC mode, mounted adjacent to cylinder 72 at a recording station 99. The corona wire 98 is arranged so that when roll 42 is in its home positon shown in FIGS. 3 and 4, the wire is located directly opposite and parallel to the emitter array 48 in the roll slot 46. The wire 98 is connected to an AC source 100 (FIG. 6) that provides about 5000 VAC and preferably the wire is equipped with a grounded electrical shield 98a to stabilize the ion currents.

The number of emitters 48a in the emitter array 48 corresponds to the number of microcells 94 in a row on cylinder 72. As shown in FIG. 6, all of the emitters have a common substrate or base 110 consisting of silicon (p-type). Thermally grown on substrate 110 is a silicon dioxide film 112 which is in the order of 1.5 microns thick. A counter-electrode or gate film 114, made of a conductive metal such as molybdenum, is deposited on film 112 and an array of holes 118 is micromachined in films 112 and 114, each hole being at the center of an emitter 48a. Within each such hole, a cone-shaped molybdenum electrode 120 is formed, the tips of each cone being centered in the corresponding hole and being in the plane of the gate film 114. The emitter array 48 and its mode of operation are described in detail in the publication *Field Emission Cathode Array Development for High-Current-Density Applications*, C. A. Spindt et al, Applications of Surface Science No. 16 (1983), pages 268–276.

In the present apparatus, the gate film 114 is connected to electrical ground. Also, the plates 94a in the row of microcells opposite array 48 are connected to a source of positive voltage in the order of 1200 volts by insulated wiper contacts 121 projecting out from array 48 which engage those plates as shown in FIGS. 5 and 6. It is a characteristic of this type of E-beam source that when a particular electrode 120 in the emitter array is pulsed negative, it wll emit a tiny spurt or beamlet of electrons with a current density in excess of 5 A/cm² toward the capacitor plate 94a opposite that electrode so as to deposit negative charge carriers on that plate as shown at the righthand side of FIG. 6. These pulses are applied to electrodes 120 by way of electrical leads 120a which extend out of drum 28 to a selector circuit 122 in buffer/controller 24 (FIG. 1) through tabular shaft 52. Since the shaft rotates during printing, a rotary connector 127 (FIG. 3) is mounted to the left-hand end of shaft 52 to connect leads 120a to the selector circuit. One section 127a of the connector rotates with the shaft; the other section 127b is stationary. Since the emitters are only in use during a recording operation when drum roll 42 is stationary in its FIG. 3 position, the spring-loaded contacts in one connector section need only be aligned and make contact with the corresponding contacts in the other connector section at this time.

When the corona wire 98 is energized by AC source 100 and cylinder 72 is sufficiently thin as herein, positive charge carriers are emitted by that wire toward the cylinder. These positive charges tend to collect on the outer surface of the cylinder (even if plates 94b are not present), but only at the locations of the microcells 94 whose plates 94a are receiving electrons from activated emitters 48a; see the right side of FIG. 6. This is because positive charges deposited at unimaged microcells and beyond the imaged microcell areas on the outer surface of the cylinder are neutralized when the AC-corona swings into its negative mode, thus leaving positive charges only in the surface areas defined by the imaged and charged microcells.

With opposite charges present on microcell plate 94a and plate 94b (or its equivalent plain surface area on the outside of the cylinder 72), a localized electrostatic field exists in the dielectric cylinder material (i.e. $Al_2O_3$) between those plates. Due to the aforementioned defect-free nature of cylinder 72, that field will persist for a very long time (i.e. a year or more) unless the microcell is discharged intentionally in order to erase the image recorded on the cylinder.

Each time a row of microcells 94 is positioned opposite emitters 48, selector circuit 122 in buffer/controller 24 activates selected ones of the emitters 48a for selected time durations dependent upon the information content in the incoming data stream. The strengths of the charges that build up at the microcells 94 opposite those activated emitters depend upon the on-times of those emitters 48a. Upon completion of emitter activation, localized electrostatic fields are present at that row of "imaged" microcells whose strengths are representative of the color values at corresponding locations in the original document.

Figure 8A:
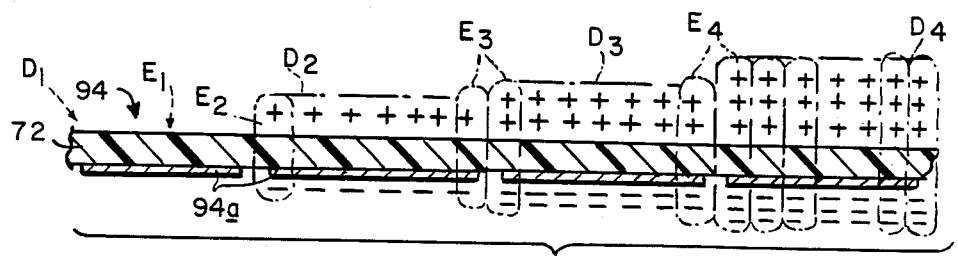
FIGS. 8A and 8B are diagrammatic sectional views illustrating the operation of the FIG. 3 printing unit.

Referring now to FIG. 8A, assume that the partial row of microcells 94 depicted there, corresponding to a partial line of resolution elements in the scanned original document, is located opposite emitter array 48. If the color of the first resolution element in the original does not require the color cyan for its reproduction, the first emitter 48a in array 48 in the cyan printing unit 26c will not be activated by selector circuit 122. Accordingly, the microcell 94 opposite that first emitter will receive no charge (i.e. not be imaged) and there will be no electric field (i.e. $E_1 = 0$) present on the cylinder at that location as seen from FIG. 8A. On the other hand, if the second resolution element of the scanned original requires a small amount of cyan in order to reproduce the color at that point in the original document, selector circuit 122 will activate the second emitter 48a in the array for a short period of time so that the microcell 94 opposite that emitter acquires a charge, of say, 30 volts, giving rise to an electrostatic field $E_2$ at that location of, say, 30,000 V/cm. Similarly, if a larger amount of cyan is required to reproduce the color in the third resolution element of the scanned original, selector circuit 122 will activate the third emitter 48a in the array for a still longer period of time so that an even larger charge, e.g. 1000 volts, builds up on the third microcell 94 giving rise to a much more intense field $E_3$ at that location of, say, 300,000 V/cm. The fourth cell 94 may receive a very large charge of, say, 1000 volts corresponding to a field $E_4$ having a strength of 106 V/cm because the original calls for a maximum amount of cyan at that point.

Thus, by controlledly activating the emitters in array 48 each time a new row of microcells 94 is positioned opposite the emitter array, an electrostatic charge pattern is built up on the surface of the cylinder very quickly, e.g. in less than 5 ns, representing the optical density distribution of a particular color in the original document. In each printing unit of press 10, the control of the charges deposited on cylinder 72 is fine enough to provide 32 steps or more of gray scale or color value in 10 volt increments at each microcell on the cylinder.

Figure 7:
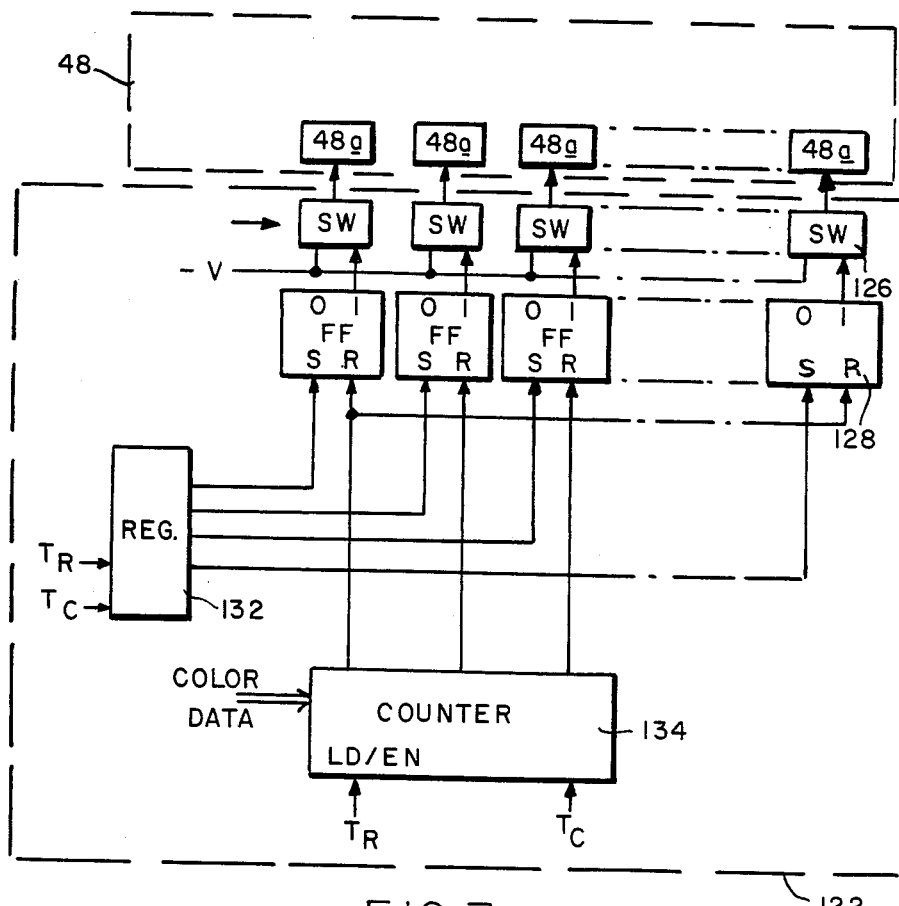
FIG. 7 is a schematic diagram of the emitter control circuit in the FIG. 3 printing unit.

It is obvious to the electronic engineer that any one of a number of selector circuit 122 designs may be used to control the on-times of the successive emitters 48a in array 48 as just described either simultaneously or successively. One such circuit design of the latter type which "scans" the emitters is illustrated in FIG. 7. As shown there, the emitters 48a, or more particularly their electrodes 120, are connected to a source of negative voltage by way of a set of separate switches 126. Switches 126 are closed only when receiving signals from the ONE outputs of a corresponding set of flipflops 128.

Circuit 122 also includes a register 132 which provides separate outputs to the SET inputs of the flipflops 128. Register 132 receives record pulses $T_R$ and high frequency clock pulses $T_C$ from buffer/controller 24. The occurrance of a $T_R$ pulse indicates that detector 88 (FIG. 3) has sensed that cylinder has been rotated to position a row of microcells 94 opposited array 48 so that those cells are ready to be imaged by the array. Each pulse $T_R$ causes register 132 to apply the clock pulses $T_C$, in order, to its output lines so as to set the flipflops 128 one after the other. All of the flipflops 128 are reset at the same time by a pulse from a counter 134 that is applied to the RESET inputs of the flipflops.

Successive numbers in the digital data stream, representing color values at successive resolution elements in the scanned original document, load successive counts in counter 134. The number for each successive resolution element is loaded into the counter by the record pulses $T_R$, which pulses are applied to the counter's LOAD ENABLE (LD/EN) terminal. Successive clock signals $T_C$, also applied to the counter, cause the counter to count down from that number to zero, whereupon the counter emits a signal to the RESET inputs of all flipflops 128. Thus the output signals from register 132, by setting flipflops 128 in sequence, select the emitters 48a in the array one after the other for activation at any given time. Each selected emitter remains activated for a time duration depending upon the color value count loaded into counter 134. The larger that number, the longer that emitter 48a remains activated and the greater the charge buildup on the microcell 94 opposite that emitter.

The flipflops 128 include internal logic elements which rule that if a flipflop 128 receives signals on both its SET and RESET inputs at the same time, the flipflop stays reset so that no output signal is applied to the corresponding switch 126. This occurs when register selects a particular emitter 48a for activation, but a zero count is loaded into counter 134 at that time denoting that that emitter should not emit electrons. Also, if a flipflop is already reset (i.e. not selected for activation) when it receives a reset signal, it stays reset and emits no signal to its corresponding switch 126.

Referring now to FIGS. 3 and 4, positioned adjacent to drum 28 on the side thereof opposite recording station 99 is an inking station 142 at which a voltage sensitive ink of the particular color being printed by printing unit 26c, i.e. cyan, is applied to the surface of the cylinder 72. As will be seen presently, the ink adheres to the cylinder surface only at the locations of microcells 94 which have been charged as aforesaid during the image recording process at recording station 99. As will be seen also, the amount of the ink deposit at each such location varies in accordance with the strength of the color-value-representing field E at that location.

At inking station 142 is a carriage 144 which rotatively supports a driven inking roller 146 whose surface is contacted by a solid bar 148 of a hot-melt or thermoplastic ink. Carriage 144 is supported in the press housing 22 for movement toward and away from drum 28 between an extended position (shown in solid lines in FIG. 4) wherein roller 146 contacts the surface of cylinder 72 and a retracted position (shown in solid lines in FIG. 3) in which the roller 146 is spaced from the cylinder. The carriage is moved between these two positions by a solenoid 149 under the control of buffer/controller 24 so that it is extended when the printing unit is actually printing hard copies of that image.

The ink in bar 148 is a two-component medium. One suitable color ink comprises a multiplicity of thermoplastic electroscopic colloidal colorant particles 148a having a relatively high melting point interspersed in a thermoplastic matrix or carrier 148b having a lower melting point. One suitable two component ink of this type has a carrier 148b consisting of a Fischer-Tropsch paraffin wax (Sasol wax M) with a melting point of about 59° C. having dispersed therein small (e.g. 1–5 microns) solid colorant particles 148a consisting of an epoxy resin having a melting point appreciably higher than that of the wax and an appropriate dyestuff dispersed in the resin. The following are examples of such colorant particle compositions:

cyan—Neozapon blue 807, Color Index No. 74400, dispersed in Epon 1004 (Shell Chemical Corp.)—melting point 95°–105° C.

yellow—Permanent yellow GG02 diazo pigment, Color Index No. 21105, dispersed in Epon 1004.

magenta—Helio Echtrosa E quinacridone pigment, Color Index No. 73915, dispersed in Areldite 6097 (Ciba-Geigy Ltd.) epoxy resin—melting point 125°–132° C.

Appropriate heaters (not shown) are provided in carriage 144 to maintain the colorant bar 148 at a temperature in the order of 20° C. and the surface of the inking roller at a temperature of 75° C. At these temperatures, the roller surface is sufficiently hot to melt the ink carrier component 148b only at the edge of the ink bar in contact with the roller. Thus, when the roller 146 is rotated, a film of ink is distributed over the surface of the roller, which film consists of the still solid, higher melting point, electroscopic colorant particles 148a dispersed in the liquid ink carrier 148b.

Positioned close to the surface of drum 28 (cylinder 72) above and below the ink station 142 are radiant heaters 152 and 154. These heaters extend the entire length of drum 28 and they include reflectors 152a and 154a, respectively, which direct the radiant heat from the heaters to the drum 28. As mentioned previously, the roll 42 component of that drum is thermally conductive so that it can absorb thermal energy from the heaters. During printing, the heater 152 is controlled so as to maintain a temperature at the surface of drum 28 above the inking station at about 75° C. which is above the melting point of the ink carrier component 148b. On the other hand, the heater 154 below the inking station is controlled so as to maintain the drum surface area at that location at about 150° C. which is well above the melting point of the thermoplastic colorant particles 148a. Suitable heat sensors (not shown) are positioned close to the drum surface above and below the inking station 142 to monitor the surface temperatures there and to turn the heaters on and off as required to maintain the correct temperatures. Alternatively, heat sensors can be embedded in drum roll 42 as shown at 156 in FIG. 4 to provide such temperature control. The leads from those sensors can exit the drum 28 via connector 127 (FIG. 3).

In press 10, it is also possible to use inks whose colloidal colorant particles 148a do not melt during their use. If such inks are employed, then of course, the heater 154 and controls therefor are not required.

As described above, the surface of the drum cylinder 72 is mildly inkophobic to an extent that even if the ink film present at the surface of roller 146 is brought into contact with the heated surface of cylinder 72 as the drum 28 is rotated, the ink normally does not wet or adhere to that surface. However, when an electronic image is recorded on cylinder 72 as described above, the electric fields present at the charged microcells in the cylinder wall attract and hold the negatively charged electroscopic colorant particles 148a to the cylinder surface, despite the slightly non-wettable property of that surface. Resultantly, those particles become deposited on the surface at the charged microcells in the row between roller 146 and cylinder 72. Furthermore, the amount of such deposit at each microcell is proportional to the strength of the electric field E present at that microcell, and as discussed above, that field strength corresponds to a particular color value for that location in the original document.

Referring now to FIGS. 4 and 6, when printing an image recorded on cylinder 72, depending on the printing mode (i.e. single or multiple copy), either the cylinder 72 alone or the entire drum 28 is rotated counterclockwise, with the inking carriage 144 in its extended position, so that successive rows of microcells are advanced to roller 146. Thus, the cylinder surface area at each charged microcell 94 in each row receives a deposit D of colorant particles 148a whose height or thickness is proportional to the strength of the electrostatic field E present at the microcell. To illustrate, the cylinder surface areas opposite the four microcells 94 in the partial row depicted in FIG. 8A that received the charges of 0, 30, 300 and 1000 volts, respectively, during the recording process described above, acquire ink deposits D at the inking station 142 whose thicknesses may be 0, 0.5 micron, 1.0 microns, and 30 microns, respectively, as shown in phantom at $D_1$, $D_2$, $D_3$, and $D_4$ in that figure. Thus, in printing unit 26c which controls the charge applied to each cylinder microcell in at least 32 steps, the thickness of the ink deposit D at each cell can be controlled to that same extent.

As mentioned above, and as shown in FIG. 8A, some minimal field spreading does occur at the edges of changed cells 94 and the "reach" of the field lines E extends above the cylinder surface. Therefore, color particles 148a do adhere to the cylinder surface between adjacent changed microcells 94 so that, as seen in that figure, there are no ink-less gaps between adjacent deposits D in the ink pattern applied to cylinder 72. But ink colorant does not adhere to uncharged areas of the cylinder.

Referring now to FIGS. 3 and 4, in the type of ink specifically described herein, the ink particles 148a deposited on the charged microcells 94 of cylinder 72 at the inking station 142 exist initially as solid particles. However, as the drum 28 is rotated counterclockwise, each row of inked microcells is moved opposite to the heater 154 and the cylinder surface there is heated to a temperature (i.e. 150° C.) sufficient to melt those particles (if they are the meltable type) so that each discrete ink deposit at a cell 94 becomes a tiny molten coherent drop or spot of colorant that covers the underlying microcell area to a thickness that represents a color value at the corresponding location in the original image. Although, the colorant particles 198a lose their individual charges when the coherent drop is formed, there are still residual inter-atomic forces (Van de Waals) that bind the drop to the cylinder surface at each charged microcell. If the ink is of the type that has non-melting colorant particles, those particles retain their charges while resident on the cylinder and adhere mildly to that surface.

As the drum 28 continues to rotate during printing, successive rows of microcells, inked to various degrees of thickness, are advanced to a transfer station 172 at which they are brought into contact with the surface of paper sheet S guided into the nip between drum 28 and pressure roller 32. Roller 32 is mounted in unit 26c for movement between an extended position shown in solid lines in FIG. 4 wherein it engages cylinder 72 and a retracted position shown in phantom there wherein it is spaced from the cylinder. It is moved between these positions by a solenoid actuator 173 (FIG. 3) under the control of buffer/controller 24. When the press is operated in its single copy printing mode, the roller always contacts the cylinder. On the other hand, when the press is printing in its multiple copy mode, the roller is retracted during recording and engages the cylinder during printing. In both cases, as the different-thickness colorant spots at each row of microcells contact the relatively cool (room temperature) surface of sheet S and encounter the pressure existing at the nip, the molten colorant at those spots penetrates the paper fibers and immediately solidifies and fuses to the paper. The adhesion of the ink colorant to the paper and the increased cohesion of the cooling colerant are strong enough to overcome the electrical forces tending to hold the ink colorant to the cylinder. Therefore, all of the colorant offsets to the paper sheet. This produces discrete cyan ink layers $L_C$ thereon whose shapes and areas are essentially the same as those of the microcells 94 and whose different thicknesses D (i.e. optical densities) represent accurately the color values for the corresponding locations on the original image being copied.

Referring to FIG. 2, printing unit 26c (as well as the other printing units) include an optical sensor 174 which detects print marks P printed automatically by cylinder 72 in the margin of sheet S as shown in that figure, or in the image area I using fluorescent invisible ink particles incorporated into a narrow section of ink bar 148. The signals from sensor 174 are compared with paper position signals developed by a shaft encoder (not shown) on pressure roll 32 or by detecting marginal clock marks M on the paper sheet S. The difference signal resulting from the comparison is then used in a conventional servo arrangement to adjust the angular position or phase of cylinder 72 in that unit to automatically maintain congruency of the dots printed by the successive printing units in press 10.

Figure 8B:
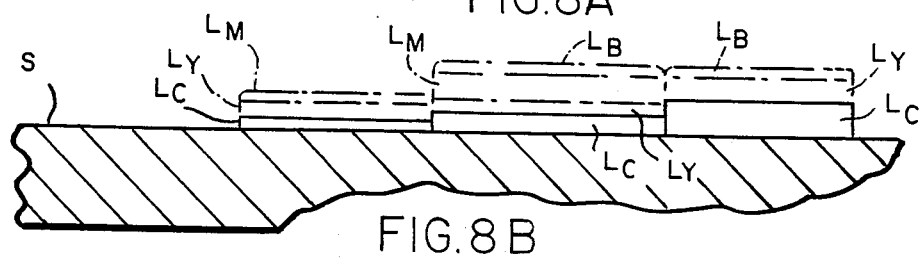

FIGS. 8A and 8B show graphically the relationship between the thickness of print layer $L_C$ and the electrostatic field E at the cylinder area (microcell) which is printing that layer. Thus the sheet S leaving the printing unit 26c in FIG. 4 which prints the color cyan, carries a pattern of dot layers $L_C$ which constitutes an accurate, high resolution rendition of the entire cyan color contribution to the finished four color reproduction that will be printed by press 10. In other words, if sheet S is transparent, the printed pattern could be used as a cyan color separation. Due to the transparency of the ink layer $L_C$, the viewing light passes through the layer until it strikes the sheet surface wherefrom it is reflected in a diffuse manner, passing through the colored ink layer $L_C$ a second time, thus enhancing the apparent color density of the observed print.

It is a distinct advantage of print unit 26c that the unit achieves such complete transfer of the ink deposited on cylinder 72 to sheet S at the transfer station 172. It means that if so desired, the thicknesses of the subtractive color transparent colorant layers on the paper can truly be representative of the desired cyan color values for the corresponding locations in the original document. Such complete ink transfer also assures that the surface of the cylinder 72 beyond transfer station 172 is completely devoid of ink particles. Therefore, there is no need to clean the surface of the cylinder prior to printing succeeding copies.

In certain applications it may be desirable to further assist the transfer of the colorant particles from the cylinder to the paper at the transfer station 172 by removing the electric fields from each row of advancing microcells 94 just as they reach the line of transfer or by subjecting the particles to a stronger opposite field that actually propells them to the paper. These field changes may be accomplished by providing a line of wipers 238 (FIG. 10) which contact the plates 94a of the row of microcells at station 172 or by depositing a strong positive static charge on the surface of sheet S, respectively.

When the press 10 is operated in its multiple-copy printing mode, i.e. for a long press run of a single image, computer 14 and buffer/controller 24 are programmed to run printing unit 26c through a recording cycle with the drum roll 42 being fixed in its home position illustrated in FIGS. 3 and 4 and pressure roller 32 and inking roller 46 being retracted away from the surface of cylinder 72 as shown in solid lines in FIG. 3. With cylinder 72 disengaged from roll 42 (i.e. by disengaging clutches 76 or activating cooling coils 81 to shrink roll 42), buffer/controller 24 controlledly drives the cylinder drive motor 82, using signals from the cylinder position sensor 88, to rotate cylinder 72 counterclockwise to position successive rows of microcells 94 opposite the emitter array 48. When each cell row is in position as signalled by the sensor 88, the emitters 48a in the emitter array are selectively activated in sequence as described above or all at once, in accordance with the incoming data stream for the color cyan which had previously been loaded into shift registers in buffer/controller 24. Thus discrete localized electrostatic charges are built up row by row on the surface of the cylinder so that by the time the cylinder has made a complete revolution, it carries a complete electrostatic image of the entire cyan contribution in the original document.

Following completion of that recording step, the printing unit is switched to a printing cycle. For this, controller 24 issues control signals to solenoids 173 and 149 to move the pressure roller 32 and inking roller 146 into rolling engagement with cylinder 72. The computer also engages clutches 78 (or expands roll 42 by deactivating coils 81) so that cylinder 72 rotates in unison with drum roll 42. Then, the controller issues a drive signal to clutch 60 thereby coupling shaft 52 to motor 58 so that the entire drum 28 rotates in the counterclockwise direction shown by arrow B in FIG. 4. As the successive rows of microcells pass through the inking station 142, colorant particles 148a are deposited on the surface of cylinder 72 at those microcells that are charged to thicknesses dependent upon the strengths of the localized electrical fields E present at those cells. The carrier component 148b of the ink remains as a liquid film on roller 146, as do unused particles 148a. As the drum surface leaves the inking station and advances toward the transfer station 172, the ink particles 148a on the surface of the cylinder beyond that station are heated sufficiently to melt them so that they form tiny coherent colorant spots on the cylinder surface. Then, as each row of inked microcells passes through the transfer station 172, all of the colorant spots thereon are transferred to and fuse to the surface of sheet S as a print layer $L_C$ whose thickness varies from point to point in correspondence with the cyan color contribution at the same points in the original image.

During a long press run with printing unit 26c printing the same image recorded on cylinder 72, that image may begin to degrade because of the loss of, or lateral migration, of the positive "image" charges on the outside of the cylinder due to the repeated re-inking of that surface with negatively charged colorant particles 148a. The illustrated printing unit is able to refresh that electronic image without having to re-record that image as described above. To do this, buffer/controller 24 energizes the corona wire 98 preferably during each revolution of the cylinder. The wire thereupon directs positive and negative charge carriers to the surface of the cylinder 72. However, as discussed above, only positive charges will remain on the outer surface of the cylinder at each microcell 94 to balance the undiminished negative charges still present at the interior plate 94a of that cell. Thus by the time the drum 28 has made a complete revolution, the entire image on the cylinder will have been refreshed. It is not even necessary to interrupt a press run in order to perform this refreshment step.

As seen from FIGS. 3 and 4, when the printing unit 26c is to print no further copies of the image recorded on its cylinder 72, that image may be erased by turning on an ultraviolet lamp 177 positioned close to the cylinder between the transfer station 172 and the recording station 99. The short wavelength light from this lamp, directed to the cylinder by a reflector 177a, renders the sapphire material of that cylinder conductive thereby shortcircuiting the microcells 94 in the microcell row or rows opposite the lamp. Thus, after at least one complete revolution of drum 28, or at least cylinder 72, past lamp 177, the entire image stored on the cylinder will have been erased.

When press 10 is operated in its single image print mode to produce automatically collated copies of a succession of different documents, e.g. pages of a book, printing unit 26c (as well as the other printing units of the press) records images on cylinder 72, inks the cylinder surface to produce a corresponding ink pattern thereon, transfers the ink pattern to paper and erases the electronic image on the cylinder to ready the cylinder to receive the next image, all at the same time. In this printing mode, buffer/controller 24 fixes roll 42 in its FIGS. 3 and 4 position and controls solenoids 173 and 149 to move pressure roller 32 and inking roller 146 into engagement with cylinder 72. The controller also deactivates clutches 78 (or cooling coils 81) so that cylinder 72 rotates independently of roll 42. Then the controller issues drive signals to motor 82, with clutch 60 disengaged, to rotate cylinder 72 to position the first and subsequent rows of microcells 94 opposite emitter 48.

When each row is in position at recording station 99, as signalled by sensor 88, the emitters in array 48 are activated in accordance with the incoming color data stream stored temporarily in buffer/controller 24 and applied at the appropriate times to activate the emitters 48a. As the electronic image "grows" as an axial band on the cylinder, as soon as the first row of imaged microcells 94 is rotated to the inking station 142, the electronic image on the cylinder begins to be "developed". In other words, at that station, ink is applied to successive rows of charged microcells 94 so that an ink pattern grows as an axial band on the cylinder, even as successive rows of image resolution elements are still being recorded on the cylinder at station 99.

Continued rotation of the cylinder advances the ink pattern row-by-row to the transfer station where, row-by-row, the dot pattern is offset completely to the sheet S, while the mid-portion of the electronic image is still being inked at station 172 and the trailing end portion of the image is still being recorded on the cylinder at station 99. Further rotation of the cylinder advances the cylinder surface carrying the beginning rows of the electronic image past UV lamp 177 which completely erases those image rows. Thus, by the time the cylinder has made one revolution, those portions of the cylinder surface are available to receive the beginning rows of the next document (page) to be recorded on the cylinder at station 99. When those first row of microcells are positioned opposite emitter array 48, controller 24 will have received and stored color and control data for the second document so that the recording of the beginning portion of that document can commence at station 99, while the trailing end of the first document is still being printed on sheet S at station 172. Such "endless" printing can generate a different print at least every two revolutions of cylinder 72 at a copy time of about three seconds/page. Using my press, documents or pages can now be printed and fed in a collated condition directly to cutting and binding apparatus, so that pamphlets, brochures and even books can be printed very quickly and efficiently on a demand basis.

As described at the outset, the printing unit 26c is one of four such units arranged in series. When the cyan component of the original image is being recorded on that unit's cylinder 72, the other printing units are receiving the data necessary to record on the cylinders of those units, electronic images corresponding to the yellow, magenta and black components of the original picture. All of the printing units 26 are operated in synchronism so that all of the units 26y, 26m and 26b lay down the respective yellow, magenta and black colorant layers $L_Y$, $L_M$, $L_B$ shown in phantom in FIG. 8B in exact register with layer $L_C$ to a thickness corresponding exactly to the color value intended for that spot on the sheet S. Furthermore, since the colorant can be a thermoplastic material, there need be little or no intermixing of adjacent layers. This is particularly true since the first layer $L_C$ is fixed to the paper when the second liquid layer $L_Y$ is fused onto it and also hardens prior to the deposit of the third layer $L_M$, and so forth. Accordingly, the light reflected from sheet S, after being filtered by the various colorant layers, appears to the observer as a substantially exact rendition of the color at the corresponding spot in the original document or of a chosen false or pseudo color value selected on the previewing terminal or monitor 16 (FIG. 1).

Although the press operator can perform color correction in the pre-press section of my system using terminal 16, there can also be provision in press 10 itself for color correction. More particularly, in the printing unit depicted in FIG. 3, columns of test microcells $94_T$ are provided at the left-hand end of cylinder 72. The outboard column of cells $94_T$ lie beyond the end of the inking roller 146 so that they receive no colorant. The inboard microcells $94'_T$ are positioned to be inked by roller 146, but they still lie outside the image area I of the copies being made by press 10. In other words, when those microcells receive ink, that ink is deposited as marks on the left-hand margin of the printed copy. Actually, these marks printed by cells $94'_T$ can be the same as the position marks P described above and depicted in FIG. 2.

Located adjacent to that end of the cylinder just beyond the inking station 142 is an electrometer 180 which is positioned to detect the electrostatic charges at the microcells $94_T$ that pass by. Also positioned at that location is a colorimitor/densitometer 182 which is arranged to monitor the color and density of the colorant deposited on microcells $94'_T$. At least two of the emitters 48a at the lefthand end of array 48 opposite cells $94_T$ and $94'_T$ are dedicated to color testing and calibration. When the printing unit is operated in its recording mode, these emitters are activated in parallel so that they emit the same number of electrons to the microcells $94_T$ and $94'_T$ opposite those emitters. As the cylinder 72 is rotated, these test emitters apply charges to the successive test microcells corresponding to the 32 charge voltage increments that the printing unit is able to apply to the microcells 94 on cylinder 72 to obtain the 32 steps of color density as described above. When the printing unit is subsequently operated in its printing mode, the test microcells $94'_T$ receive colorant deposits D according to the strengths of the fields E thereat, in up to 32 different thicknesses.

During the operation of the printing unit, the charges on the microcells $94_T$ are detected by electrometer 180 and the color hues and densities are detected by detector 182. The outputs from the two detectors are applied, via buffer/controller 24, as Color Correction Signals to computer 14. The computer thereupon processes the signals to develop corrected Color Data which is applied to the test emitters to increase or decrease the voltages to which the test microcells opposite those emitters are charged in order to obtain the desired color values at the microcells $94'_T$. From that information, the computer determines the emitter on-times required to obtain those charges. These on-times are reflected as counts applied to counter 134 when the emitters 48a opposite the test microcells are being selected by register 132 as described above in connection with FIG. 7.

There are thus developed 32 numbers corresponding to the desired 32 optical density values for the particular color, i.e. cyan. These color value numbers are stored in a look-up table in computer 14 and the table is updated from time to time by similar periodic testing of the test microcells $94_T$ and $94'_T$. The data stream for the printing unit 26c constituting a string of numbers to be applied to counter 134 is first compared by computer 14 with the numbers in the look-up table and the number from that table closest to the particular input number is substituted for delivery to counter 134. In this way, the system will correct for color variations due to aging of the emitter array, different ink lots, etc.

It is even possible to monitor the final colors printed on sheet S by arranging one column of inked test microcells $94'_T$ in each of the printing units so that they print in register and a second column of test microcells $94'_T$ so that they print out of register with those in the other units. With this arrangement, printed copy leaving press 10 will have in its margins outside the image area I a color scale (i.e. marks P) for each color printed by the press, as well as a scale of combined color values. Appropriate colorimeters and densitometers (not shown) may be positioned at the press output to detect the hues and densites of these colors. The output values of these instruments may be compared with standardized values representing standard color scales to develop correction signals to be utilized by computer 14 to correct the data applied to the various printing units to achieve the desired tonal densities and hues in the colors printed by the press.

My invention can also be incorporated into a small, compact desk-top printer capable of printing color copies on ordinary $8\frac{1}{2} \times 11$ paper for example. Such a copier is indicated generally at 202 in FIGS. 9 and 10. As seen there, that copier comprises a dielectric cylinder shown generally at 204 having an array of capacitor microcells 206 on its cylindrical surface. The cylinder is provided with endplates 208 to which axles 210 are connected for mounting the cylinder for rotary movement within a housing indicated at 212. Circumferential arrays of sprockets 214 are provided at the opposite ends of the cylinder wall which sprockets are arranged to engage in marginal sprocket holes 216 in the paper S used by copier 202. That paper is fed by a conventional paper feeder to the nip between cylinder 204 and a pressure roll 218 rotatively mounted in housing 212 at a transfer station 217.

Cylinder 204 can be rotated in either direction by a suitable stepper motor (not shown) under the control of controller 220 in housing 212. Positioned adjacent to cylinder 204 at a recording station 222 is an AC corona wire 224 similar to wire 98 described above. Also located adjacent to the cylinder at an inking station 226 is a multi-color inking member shown generally 228 which is rotatively mounted via a shaft 228a to housing 212. That inking member carries a plurality, herein four, different color ink bars 228b similar to bar 148 described above. Preferably these bars are biased outward to some extent and have the four colors cyan, yellow, magenta and black. The inking member 228 can be rotated in at least one direction by a suitable motor (not shown) under the control of controller 220 to assume different positions that place the edges of the four bars in contact with the surface of cylinder 204.

Located inside cylinder 204 are the printing components described above required to record an electrostatic charge pattern on the surface of cylinder 204 at recording station 222 and to heat the ink applied to the surface of the cylinder at station 226 and to encourage transfer of the ink pattern to paper sheet S at transfer station 217 and to erase the electronic image on the cylinder after such transfer. These components include a linear electron emitter array 232 opposite corona wire 224 and a thermal source 234 for heating the surface of the cylinder upstream from the inking station 226 to a temperature high enough to maintain the ink bar 228b edge in contact with the cylinder as a liquid film, as described above. A heat reflector 234a extending around source 234 and close to the inside surface of the cylinder heats the portion of the cylinder beyond or downstream from inking station 226 to a higher temperature sufficient to melt thermoplastic colorant particles in the ink so that the ink pattern on the surface of the cylinder is in liquid form when being transferred to sheet S at station 217.

Also located in cylinder 204 is a linear array of wiper contacts 238 which are arranged to touch and thereby discharge the interior plates of the microcells 206 present at transfer station 217 to facilitate the offsetting of the ink pattern to the sheet S at that station as described above. These contacts are mounted to a rotary solenoid 239 so that they can be moved into an out of engagement with the cell plates under the control of controller 220. Finally, located beyond contacts 238 in a UV lamp 240 for discharging the microcells rotated beyond the transfer station 217 so that that portion of the cylinder is ready to receive a new electrostatic image before advancing to recording station 222, all as described above.

Figure 10:
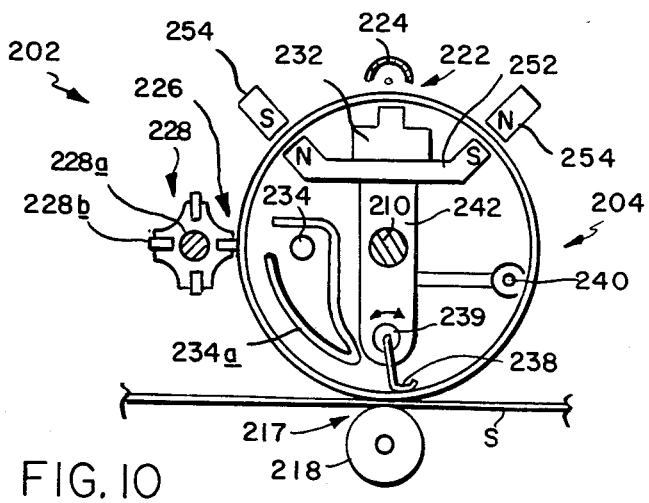
FIG. 10 is a vertical sectional view of the FIG. 9 printer.

All of the copier components inside drum 204 are mounted to the common bracket 242. Since it is necessary to maintain emitter array 232 (as well as the other components inside cylinder 204) fixed with respect to corona wire 234, while permitting cylinder 204 to be rotated, means are provided for suspending those components in a fixed position inside the cylinder. As shown in FIG. 10, these means consist of sets of magnets 252 mounted to bracket 242 at spaced apart locations along the length of the cylinder. These internal magnets 252 have opposite poles N and S located just inside the cylinder wall which are disposed directly opposite poles of opposite polarity S and N of exterior magnets 254 mounted in the housing 212 outside the cylinder. Similar sets of interior and exterior magnets may be provided adjacent to the bottom of the cylinder so that all of the printer components inside the cylinder are supported in a fixed position relative to the printer components outside the cylinder, thereby allowing the cylinder itself to be rotated freely on its shaft 210 in the gaps between the interior and exterior magnets. Also since a high vacuum, i.e. $10^{-7}$ Torr, should be maintained inside cylinder 204 for a prolonged period (e.g. 5 years), to minimize maintenance, highly efficient ferrofluid seals (not shown) are provided at any joints between the rotary and stationary parts of the copier.

When making color prints using copier 202, the inking member 228 is rotated to position, say, the cyan color bar 228b against the cylinder. Then the cylinder is rotated while an electrostatic image is written onto successive rows of microcells 206 at recording station 222 as described above. When the charged microcells in those rows reach the inking station 226, they pick up voltage-sensitive cyan colorant to form an ink pattern on the cylinder as described above. As those inked cells reach transfer station 217, the colorant thereon, comprising the leading end portion of the image to be printed, is transferred to sheet S while succeeding portions of the electrostatic pattern on the cylinder are being inked and while the trailing end portions of the pattern to be printed are still being recorded on the cylinder at station 222.

After about 1¾ revolutions of the cylinder 204, the entire pattern comprising the cyan color component of the original image will have been printed on sheet S and become fused thereto. When desired, the contacts 238 may be rotated into position against the interior plates of the microcells at station 217 to discharge those cells to ensure complete ink transfer at that location. Also, the shielded lamp 240 remains illuminated so that the microcells advancing past that lamp are discharged automatically. Therefore, the cylinder surface beyond the transfer station is ready to receive a new electrostatic image.

Controller 220 now reverses the rotation of cylinder 204, while rotating the printing member 228 to position the next ink bar 228b, i.e. yellow, against the cylinder. As the cylinder rotates in reverse, it shifts the paper sheet S to the left to its original position. Although the printed side of the sheet contacts cylinder 204, the ink, being completely dry and fused to the sheet surface, does not offset to the cylinder. Controller 220 then commences a second printing cycle to print the yellow component of the original image on sheet S. For this, a new electrostatic image corresponding to that yellow component is recorded on the cylinder cell-row-by-cell-row at recording station 222 and those charged cells are inked at inking station 226, as before, while succeeding portions of the original image are still being recorded at station 222. Continued rotation of the cylinder advances the inked microcells to the transfer station 217 where the yellow ink pattern is transferred to sheet S. Since the movement of the paper sheet is keyed directly to the motion of the cylinder by way of the sprockets 214 and paper holes 216, the yellow image printed on sheet S is exactly in register with the previously printed cyan image thereon.

Controller 220 then carries out a third printing cycle by returning the cylinder to its original location and rotating the inking member to position the magenta color bar against the cylinder and executing another set of recording, inking and transfering operations to print the magenta component of the original image on sheet S exactly in register with the cyan and yellow components. If the color black is to be printed, a fourth printing cycle is executed so that the resultant printed image on sheet S is a four color reproduction of the original image, with the color content of each resolution element of the copy faithfully reproducing the color content of the original image, all as described above in connection with press 10.

It will thus be seen that the objects set forth above, among those made apparent from the preceding descriptions, are efficiently attained, and since certain changes may be made in the above constructions and in the printing method described above without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described.

What is claimed as new and desired to be secured by Letters Patent of the United States is:

1. A method of printing on a printing medium a variable thickness ink dot pattern representing an original image in response to an incoming digital data stream comprising the steps of:
   A. forming printing means having a printing surface;
   B. defining in the printing means a multiplicity of discrete, independently electrically chargable capacitor microcells adjacent to said printing surface;
   C. activating selected ones of the microcells in accordance with the incoming data stream so that the activated microcells are geometrically related to the dots in the pattern to be printed;
   D. depositing electrical charges on the microcells selected for activation at controlled, variable coulombic charge levels to create at said printing surface localized electrical fields of various strengths that are proportional to the print densities desired for said related data in the pattern to be printed;
   E. contacting said printing surface with a voltage sensitive ink in liquid form whereby the ink, under the influence of said fields, is deposited on said printing surface only at the locations of said microcells selected for activation, with the thickness of each said ink deposit being proportional to the strength of the field at that microcell thereby to form a variable-thickness ink pattern on the said printing surface; and
   F. transferring said ink pattern to said printing medium to provide a faithful hardcopy reproduction of said original image.

2. The method defined in claim 1 and including the additional steps of:
   A. selecting for contact with said printing surface a two-component thermoplastic ink comprising a thermoplastic carrier containing a dispersion of voltage sensitive colorant particles;
   B. heating the printing surface to a temperature sufficient to melt the ink carrier where it contacts said surface to create a thin coherent liquid ink film in contact with said surface;
   C. forming said printing surface to be mildly ink repellent so that it is not wet by the contacting molten ink carrier and the colorant particles therein; and
   D. moving the printing surface so as to advance charged and uncharged microcells through the ink film whereby the voltage sensitive colorant particles from the liquid film adhere to said printing means surface despite the ink repellent property thereof only at the locations of charged microcells, the remaining area of said printing means surface remaining free of ink.

3. The method defined in claim 2 including the additional steps of:
   A. forming said colorant particles from a thermoplastic material having a melting point higher than that of the ink carrier; and
   B. heating the printing means surface already contacted by the ink film to a temperature high enough to melt the colorant particles adhering to that surface so that said ink pattern on the printing means surface is in liquid form when being transferred to the printing medium.

4. The method defined in claim 3 and including the additional step of maintaining the printing medium at a temperature well below the melting point of the colorant particles so that those particles fuse to the printing medium immediately upon contact therewith.

5. The method defined in claim 4 including the additional step of controlling the amount of heat at the point of transfer of the ink from the printing means surface to the printing medium and the affinity of the printing medium to the ink colorant and the repellant property of the printing means surface to the colorant particles so that the colorant transfers completely to the printing medium eliminating the need for cleaning the printing means surface after each copy is made.

6. The method defined in claim 5 including the additional step of discharging the printing means surface to remove the electrical fields thereon following transfer of the colorant thereon to said printing medium.

7. The method defined in claim 5 including the additional steps of:
   A. applying to the printing means surface a first charge pattern representing one color component of the image to be printed;
   B. contacting the printing means surface with a thermoplastic transparent ink corresponding to said one color component to form a first color ink pattern theron;
   C. transfering the first ink pattern to a printing medium;
   D. removing said first charge pattern from the printing means surface;
   E. applying at least one additional charge pattern to the printing means surface following transfer of said first color ink pattern to the printing medium, said at least one additional charge pattern representing a second color component of the image to be printed;
   F. contacting the printing means surface with thermoplastic transparent ink corresponding to said second color component to form a second color ink pattern on said surface; and
   G. transferring said second color ink pattern to the printing medium in register with the first color ink pattern thereon so that the printing medium carries a congruent area subtractive color print of the original image.

8. The method defined in claim 1 and including the additional step of subjecting the voltage sensitive ink adhering to the printing means surface to an electrostatic field change at the point of transfer to the printing medium that promotes such transfer.

9. Printing apparatus responsive to an incoming digital data stream for printing on a printing medium variable thickness ink dot patterns representing an original image, said apparatus comprising:
   A. printing means having a printing surface;
   B. means defining in said printing means a multiplicity of discrete, independently electrically chargable capacitor microcells adjacent to said surface;
   C. means for activating selected ones of said microcells in accordance with the incoming data stream, the activated microcells being geometrically related to the dots in the pattern to be printed;
   D. means for depositing electrical charges on the microcells selected for activation at controlled, variable coulombic charge levels to create at said printing means surface localized electrical fields of various strengths that are proportional to the print densities desired for said related dots in the pattern to be printed;
   E. a voltage sensitive ink for application as a liquid to said printing means surface;
   F. means for contacting said surface with said liquid ink whereby, under the influence of said fields, said ink is deposited on said printing means surface only at the locations of said microcells selected for activation, with the thickness of each said ink deposit being proportional to the strength of the field at that microcell thereby to form a variable-thickness ink pattern on said printing means surface; and
   G. means for transferring said ink pattern to said printing medium whereby the ink dot pattern printed on the printing medium is a faithful reproduction of said original image.

10. The apparatus defined in claim 9:
    A. wherein said printing means comprises a rigid, thin-walled homogeneous dielectric structure having opposite surfaces one of which constitutes said printing means surface;
    B. said microcell defining means comprise a set of spaced-apart, thin, electrically conductive plates affixed to the other of said printing means surfaces and the portions of said structure opposite said plates, the geometry and placement of said set of plates defining the geometry and placement of said microcells on said printing means surface.

11. The apparatus defined in claim 10 wherein said structure is made of sapphire.

12. The apparatus defined in claim 10 and further including a second similar set of conductive plates affixed to said other wall surface, with each plate in the second set being located directly opposite the corresponding plate in the first set of plates.

13. The apparatus defined in claim 10 wherein the plates in said set of plates are recessed into said other printing means surface.

14. The apparatus defined in claim 10 wherein:
    A. said printing means structure is a cylinder; and
    B. said plates in said set of plates are arrayed in columns around said cylinder and in rows along said cylinder.

15. The apparatus defined in claim 10 wherein:
    A. said depositing means comprise:
       1. a set of electron emitters spaced from said other printing means surface opposite to plates of said set of plates and which, when energized, controlledly deposit electrons on said plates, and
       2. positive charge source means spaced from said printing means surface and for depositing positive charge carriers on the printing means surface at microcells whose plates receive electrons from said emitters; and
    B. said activating means comprise:
       1. means for moving said printing means relative to said positive charge source and said set of emitters, and
       2. means for energizing the emitters in said set of emitters when they are disposed opposite said microcells selected for activation so that electrons are deposited on the plates of those microcells.

16. The apparatus defined in claim 10 wherein:

A. said ink is a thermoplastic ink which melts at a selected temperature so that it can be applied to said printing means surface as a liquid film; and B. means for heating the ink deposited on said printing means surface to maintain it in a melted state until said ink pattern is transferred from said printing means surface to said printing medium.

17. The apparatus defined in claim 16 wherein:

A. said printing means surface is mildly repellent to said ink; and

B. said ink is a two-component ink composed of an electrically neutral thermoplastic carrier which melts at said selected temperature and which contains a dispersion of voltage sensitive colorant particles, said repellent printing means surface picking up colorant particles from the ink carrier only at locations thereon corresponding to charged microcells where attractive field forces are present which overcome the repellent property of the printing means surface.

18. The apparatus defined in claim 17 wherein:

A. said colorant particles are thermoplastic particles which melt at a higher temperature than said selected temperature; and B. means for heating the colorant particles deposited on said printing means surface to said selected higher temperature so that said particles melt forming colorant droplets on said surface that define said ink pattern thereon, said droplets being cooled upon transfer to the printing medium by the ink pattern transferring means whereby said ink pattern offsets completely from the printing means surface and becomes fused to the printing medium.

19. The apparatus defined in claim 17 and further including means for removing or changing the fields to which the ink pattern on the printing means surface is subjected at the point of transfer to the printing medium so that said pattern is encouraged to offset to the printing medium.

20. The apparatus defined in claim 9 and further including means for removing said fields at the microcells underlying portions of said ink pattern after said pattern portions are transferred to the recording medium.

21. The apparatus defined in claim 20 wherein said removing means comprise means for discharging said microcells.

22. In printing apparatus of the type including a printing member having a substantially smooth, unbroken printing surface for printing on a printing medium an ink pattern representative of an original image, a recording station for applying an electronic charge pattern to said printing member, an inking station for applying a voltage sensitive ink to said surface and a transfer station for transferring ink from said surface to a printing medium to form a printed image thereon, the improvement wherein said printing member comprises:

A. a rigid, thin-walled, dielectric structure having opposite surfaces one of which constitutes said printing surface;

B. means defining in said printing member an array of closely packed, but discrete, capacitor microcells which array extends over the area of said printing surface, each microcell being separately chargeable at said recording station so as to acquire a discrete localized electrical field thereat whose field lines are perpendicular to, and extend above, said printing surface.

23. The apparatus defined in claim 22 wherein said recording station includes means for charging selected microcells of said microcell array to a plurality of selected charge levels.

24. The apparatus defined in claim 23 wherein said microcell defining means include a set of closely spaced, thin, electrically conductive plates affixed to the other of said opposite surfaces, said set of plates extending over an area of said other of said opposite surfaces that is coextensive with said printing surface area.

25. The apparatus defined in claim 24 and further including a second set of closely spaced, thin, electrically conductive plates affixed to said printing surface, each plate of the second set of plates being congruent to a corresponding plate of said set of plates.

26. The apparatus defined in claim 24 wherein said recording station includes:

A. an electron source for controlledly applying negative charge carriers to the certain plates of said set of plates that define to said selected microcells; and B. a positive charge source for directing positive charge carriers to said printing surface, said positive charge carriers collecting at said printing surface only at areas thereof opposite said certain plates thereby to form a pattern of tiny electropositive charge islands on said printing surface.

27. The apparatus defined in claim 26 wherein microcell charging means include:

A. a corona source operated in the AC mode and closely spaced from said printing surface for directing positive electrical charge carriers to said printing surface;

B. an array of electron beam emitters closely spaced from said other of said opposite surfaces and fixed opposite said corona source and which, when activated, deposit negative charge carriers on said certain plates;

C. means for moving said printing member relative to said corona source and to said emitter array; and D. means for activating certain emitters in the emitter array when they are positioned opposite said certain plates.

28. The apparatus defined in claim 27 and further including control means for controlling the magnitudes of the negative charge carrier deposits on said certain plates in accordance with a stream of picture signals representing said original image so as to create at said printing surface localized electrical fields of various strengths that are proportional to the print densities desired for the corresponding locations in the pattern to be printed by said printing member.

29. The apparatus defined in claim 28 wherein said control means include means for controlling the on-times of said certain emitters.

30. The apparatus defined in claim 27 wherein said corona source comprises:

A. a corona wire; and

B. an AC voltage source connected to said wire.

31. The apparatus defined in claim 30 and further including a grounded electrically conductive shield extending around said wire except where said wire faces said printing surface.

32. The apparatus defined in claim 27 wherein:

A. said printing member is a rotary cylinder whose outer surface constitutes said printing surface;

B. the microcells in said array are arranged in rows extending along said cylinder;

C. said corona source is an elongated corona wire extending parallel to the microcell rows; and D. said emitter array is a linear array positioned inside the cylinder directly opposite and parallel to said corona wire.

33. The apparatus defined in claim 32 and further including:

A. means for closing the ends of said cylinder; and

B. means for maintaining the interior of the cylinder under a high vacuum.

34. The apparatus defined in claim 32 wherein:

A. said moving means include means for rotating the cylinder; and

B. said emitter activating means include
1. means for monitoring the angular position of the cylinder to produce position signals, and
2. means responsive to the position signals for energizing one or more of said certain emitters when the cylinder is oriented to position a microcell row containing one or more of said certain plates opposite to said array.

35. The apparatus defined in claim 34 and further including control means for operating said rotating means, said activating means and said inking station and said transfer station in synchronism so that, simultaneously, an electronic charge pattern can be applied to a first sector of said cylinder, ink can be applied to a second sector of said cylinder, and ink can be transferred to the printing medium from a third sector of said cylinder.

36. The apparatus defined in claim 35

A. further including means for coupling motion of the printing surface to the printing medium so that the two move in unison;

B. wherein said inking station includes
1. a plurality of different color inks, and
2. movable means for contacting said printing surface selectively with any one of said inks; and C. wherein said control means also operates said contacting means and said rotating means so that after first color ink is transferred to said printing medium, the cylinder is rotated in reverse to return the printing surface and printing medium to their original positions and said contacting means is moved so that said printing surface is contacted by a second one of said plurality of different color inks whereupon the control means rotates the cylinder in the forward direction again to record a second electronic pattern on the printing surface, printing a second color component of the pattern to be printed, and to apply second color ink to said printing surface and to transfer said second color ink to said printing medium congruently to said first color ink transferred thereto.

37. The apparatus defined in claim 32 and further including:

A. a thermally conductive cylindrical roll;

B. means for rotatively mounting the roll inside said cylinder for rotation coaxially therewith;

C. means for mounting said emitter array at the surface of said roll so that the array extends parallel to the roll axis; and D. means for selectively coupling together the rotary motions of the roll and cylinder so that the cylinder can be rotated independently of the roll or with the roll.

38. The apparatus defined in claim 37 and further including a dielectric sleeve encircling said roll for insulating said roll from said plates on said cylinder.

39. The apparatus defined in claim 32 and further including means for detecting the magnitudes of the charges on certain microcells in said microcell array, only some of which constitute said selected microcells.

40. The apparatus defined in claim 23 and further including means for discharging the microcells charged at said recording station.

41. The apparatus defined in claim 23 wherein said printing member is composed of a heat resistant material whose structural and dielectric properties are not degraded at high temperatures.

42. The apparatus defined in claim 41 wherein said inking station includes:

A. a body of thermoplastic ink which melts at a selected temperature;

B. means for contacting the printing surface with said ink; and

C. means for heating the ink contacting the printing surface to a temperature above said selected temperature so that the ink applied to the printing surface remains a liquid until the ink is transferred to said printing medium at the transfer station.

43. The apparatus defined in claim 42 wherein:

A. the printing means surface is mildly repellant to said ink;

B. said ink is a two-component ink composed of an electrically neutral thermoplastic carrier which melts at said selected temperature and which contains a dispersion of voltage sensitive colorant, said repellant printing surface picking up colorant from the ink carrier only at locations thereon corresponding to charged microcells where field forces are present which attract and hold said colorant to those surface locations despite the repellant property of the printing surface.

44. The apparatus defined in claim 43 wherein:

A. said colorant is a thermoplastic which melts at a higher temperature than said selected temperature; and B. means for heating the colorant held to the printing surface to said higher temperature so that said colorant melts forming colorant droplets on said printing surface, which remain in liquid form until transferred to the printing medium at the transfer station.

45. The apparatus defined in claim 44 wherein said transfer station includes means for removing or changing the fields to which colorant held to said printing surface is subjected at the point of transfer of said colorant to the printing medium so as to promote transfer of said colorant to the printing medium.

46. The apparatus defined in claim 45 and further including means downstream from said transfer station for discharging said microcells.

47. The apparatus defined in claim 46 wherein said discharging means include an ultraviolet lamp which emits short wavelength light.

48. The apparatus defined in claim 44 and further including means for controlling the relative temperature of the printing surface and the printing medium so that the surfaces of the colorant droplets that contact the printing medium at the transfer station cool and fuse to the printing medium thereby increasing the cohesiveness of the remaiders of the colorant droplets so that the colorant droplets offset completely from the printing surface thereby eliminating the need for cleaning the printing surface.

49. A method of printing on a printing medium an ink dot print pattern in color representative of an original color image, said method including the steps of:
- A. forming a dielectric printing member having a printing surface that is somewhat ink repellant;
- B. applying to said printing surface a first pattern of tiny discrete localized electropositive charge deposits representive of a first color component of said original image;
- C. controlling the magnitude of each deposit in the pattern so that said magnitude is representative of the print density desired for the related dot in the print pattern to be printed;
- D. contacting said printing surface with a first color electroscopic ink in liquid form whereby the ink is deposited on the printing surface as ink dots only at the locations of said charge deposits in said first charge deposit pattern, with the thickness of the first color ink dot at any location on the printing surface being proportional to the magnitude of the underlying first pattern charge deposit, thereby to form a variable thickness first color ink dot pattern on the printing surface; and
- E. transferring said first color ink dot pattern to said printing medium to form said print pattern thereon.

50. The method defined in claim 49 including the additional steps of:
- A. selecting for contact with the printing surface a two-component thermoplastic ink comprising a thermoplastic carrier containing a dispersion of electroscopic transparent colorant;
- B. heating the printing surface to a temperature sufficient to melt the ink carrier where it contacts the printing surface to create a thin coherent liquid ink film in contact with the printing surface;
- C. moving the printing member so as to advance the printing surface through the ink film whereby the electroscopic colorant in said film adheres to the printing surface only at the locations of said charge deposits, the remaining area of the printing surface remaining free of ink; and
- D. heating the area of the printing surface already contacted by the ink film to a temperature high enough to melt the colorant adhering to that surface so that said ink dot pattern on the printing surface remains in liquid form until transferred to the printing medium.

51. The method defined in claim 49 and including the additional steps of:
- A. removing the charge deposits from the printing surface following transfer of the first color ink dot pattern to the printing medium;
- B. applying to said printing surface a second pattern of tiny, discrete, localized electropositive charge deposits representing a second color component of said original image;
- C. controlling the magnitude of each deposit in the second charge deposit pattern so that said magnitude is representative of the print density desired for the related color dots in the print pattern to be printed;
- D. contacting the printing surface with an electroscopic ink of a second color in liquid form whereby the ink is deposited on the printing surface as second color ink dots only at the locations of said second charge deposit pattern deposits, with the thickness of each said second color ink drop being proportional to the magnitude of the underlying second pattern charge deposit, thereby to form a variable thickness second ink dot pattern on the printing surface; and
- E. transferring said second color ink dot pattern to the printing surface in exact register with the first color ink dot pattern transferred to said printing surface so that corresponding first and second color ink dots of the two ink dot patterns are congruent to provide a congruent area subtractive color rendition of the original image.

52. The method defined in claim 51 wherein the ink dots of the first color ink dot pattern are solidified and fused to the printing medium before ink dots of the second color ink dot pattern are transferred to the printing medium congruently to ink dots of the the first color ink dot pattern.

53. The method defined in claim 51 including the additional step of subjecting the ink dots being transferred from the printing surface to the printing medium to an electrostatic field change which promotes their transfer to the printing medium.

* * * * *

UNITED STATES PATENT AND TRADEMARK OFFICE
CERTIFICATE OF CORRECTION

PATENT NO. : 4,792,860

DATED : December 20, 1988

INVENTOR(S) : Manfred R. Kuehnle

It is certified that error appears in the above-identified patent and that said Letters Patent is hereby corrected as shown below:

On the title page [75]: change inventor's name "Kuehrle" to --Kuehnle--.

Signed and Sealed this

Eleventh Day of August, 1992

*Attest:*

DOUGLAS B. COMER

*Attesting Officer*     *Acting Commissioner of Patents and Trademarks*